(12) United States Patent
Sasaki et al.

(10) Patent No.: US 9,741,370 B2
(45) Date of Patent: Aug. 22, 2017

(54) MAGNETIC HEAD FOR PERPENDICULAR MAGNETIC RECORDING INCLUDING A COIL HAVING AN INCLINED SURFACE

(71) Applicants: Yoshitaka Sasaki, Santa Clara, CA (US); Hiroyuki Ito, Milpitas, CA (US); Kazuki Sato, Milpitas, CA (US); Yukinori Ikegawa, Milpitas, CA (US); Hironori Araki, Milpitas, CA (US); Shigeki Tanemura, Milpitas, CA (US)

(72) Inventors: Yoshitaka Sasaki, Santa Clara, CA (US); Hiroyuki Ito, Milpitas, CA (US); Kazuki Sato, Milpitas, CA (US); Yukinori Ikegawa, Milpitas, CA (US); Hironori Araki, Milpitas, CA (US); Shigeki Tanemura, Milpitas, CA (US)

(73) Assignee: HEADWAY TECHNOLOGIES, INC., Milpitas, CA (US)

(*) Notice: Subject to any disclaimer, the term of this patent is extended or adjusted under 35 U.S.C. 154(b) by 12 days.

(21) Appl. No.: 14/664,466

(22) Filed: Mar. 20, 2015

(65) Prior Publication Data

US 2016/0275970 A1  Sep. 22, 2016

(51) Int. Cl.
*G11B 5/10* (2006.01)
*G11B 5/17* (2006.01)
*G11B 5/31* (2006.01)
*G11B 5/127* (2006.01)

(52) U.S. Cl.
CPC .............. *G11B 5/3116* (2013.01); *G11B 5/10* (2013.01); *G11B 5/17* (2013.01); *G11B 5/1278* (2013.01); *G11B 5/3163* (2013.01)

(58) Field of Classification Search
CPC ........... G11B 5/17; G11B 5/31; G11B 5/3123; G11B 5/315
USPC ........................................ 360/123.02–123.09
See application file for complete search history.

(56) References Cited

U.S. PATENT DOCUMENTS

| 8,345,381 | B1* | 1/2013 | Sasaki ...................... G11B 5/17 360/123.03 |
| 8,385,019 | B1 | 2/2013 | Sasaki et al. |
| 9,082,422 | B2* | 7/2015 | Sasaki .................. G11B 5/3163 |
| 9,230,568 | B1* | 1/2016 | Ikegawa ............... G11B 5/3116 |
| 2009/0059426 | A1* | 3/2009 | Sasaki .................. G11B 5/1278 360/125.02 |

\* cited by examiner

*Primary Examiner* — Carlos E Garcia
(74) *Attorney, Agent, or Firm* — Oliff PLC

(57) ABSTRACT

A magnetic head includes a coil, a main pole, a write shield, a gap section, and a return path section. The main pole has a top surface including an inclined portion and a flat portion. The coil includes a specific coil element. The specific coil element has a front end portion, and an inclined surface contiguous with the front end portion. The write shield includes a top shield layer located on the front side in the direction of travel of a recording medium relative to the main pole, and located closer to a medium facing surface than the specific coil element. The top shield layer is located on the rear side in the direction of travel of the recording medium relative to an imaginary plane including the inclined surface of the specific coil element.

9 Claims, 21 Drawing Sheets

MAGNETIC HEAD FOR PERPENDICULAR MAGNETIC RECORDING INCLUDING A COIL HAVING AN INCLINED SURFACE

BACKGROUND OF THE INVENTION

1. Field of the Invention

The present invention relates to a magnetic head for perpendicular magnetic recording for use to write data on a recording medium by means of a perpendicular magnetic recording system.

2. Description of the Related Art

The recording systems of magnetic read/write apparatuses include a longitudinal magnetic recording system in which the magnetization of signals is directed along the plane of a recording medium (the longitudinal direction), and a perpendicular magnetic recording system in which the magnetization of signals is directed perpendicular to the plane of a recording medium. It is known that the perpendicular magnetic recording system is harder to be affected by thermal fluctuation of the recording medium and capable of providing higher linear recording density, compared with the longitudinal magnetic recording system.

Magnetic heads for perpendicular magnetic recording typically have, like those for longitudinal magnetic recording, a structure in which a read head unit having a magnetoresistive element (hereinafter, also referred to as MR element) for reading and a write head unit having an induction-type electromagnetic transducer for writing are stacked on a substrate. The write head unit includes a coil and a main pole. The main pole has an end face located in a medium facing surface facing a recording medium. The coil produces a magnetic field corresponding to data to be written on the recording medium. The main pole passes a magnetic flux corresponding to the magnetic field produced by the coil, and produces a write magnetic field from its end face.

A magnetic head for use in a magnetic disk drive such as a hard disk drive is typically provided in a slider. The slider has the medium facing surface. The medium facing surface has an air inflow end (a leading end) and an air outflow end (a trailing end). An airflow that comes from the air inflow end into the space between the medium facing surface and the recording medium causes the slider to slightly fly over the surface of the recording medium.

Here, the side of the positions closer to the leading end relative to a reference position will be referred to as the leading side, and the side of the positions closer to the trailing end relative to the reference position will be referred to as the trailing side. The leading side is the rear side in the direction of travel of the recording medium relative to the slider. The trailing side is the front side in the direction of travel of the recording medium relative to the slider.

The magnetic head is typically disposed near the trailing end of the medium facing surface of the slider. In a magnetic disk drive, positioning of the magnetic head is performed by a rotary actuator, for example. In this case, the magnetic head moves over the recording medium along a circular orbit about the center of rotation of the rotary actuator. In such a magnetic disk drive, a tilt of the magnetic head with respect to the tangent of the circular track, which is called a skew, occurs depending on the position of the magnetic head across the tracks.

Particularly, in a magnetic disk drive of the perpendicular magnetic recording system which is higher in capability of writing on a recording medium than the longitudinal magnetic recording system, the skew mentioned above can cause the phenomenon that signals already written on one or more tracks that are adjacent to a track targeted for writing are erased or attenuated during writing of a signal on the track targeted for writing. In the present application, this phenomenon will be called unwanted erasure. The unwanted erasure includes adjacent track erasure (ATE) and wide-area track erasure (WATE). To achieve higher recording densities, it is necessary to prevent the occurrence of unwanted erasure.

In order to prevent the occurrence of unwanted erasure induced by a skew and achieve higher recording densities, it is effective to configure the main pole so that the thickness of its portion near the medium facing surface decreases with increasing proximity to the medium facing surface, and also provide a write shield that has an end face located in the medium facing surface and surrounding the end face of the main pole.

In a magnetic head including the write shield, there is typically provided a return path section for connecting the write shield to a portion of the main pole located away from the medium facing surface. The write shield, the return path section and the main pole define a space for a portion of the coil to pass therethrough. The write shield and the return path section have the function of capturing a magnetic flux that is produced from the end face of the main pole and spreads in directions other than a direction perpendicular to the plane of the recording medium, thereby preventing the magnetic flux from reaching the recording medium. The write shield and the return path section also have the function of allowing a magnetic flux that has been produced from the end face of the main pole and has magnetized a portion of the recording medium to flow back to the main pole.

The position of an end of a record bit to be recorded on the recording medium is determined by the trailing-side edge of the end face of the main pole located in the medium facing surface. In order to define the position of the end of the record bit accurately, it is therefore important that the write shield include a trailing shield which is located on the trailing side relative to the main pole.

With increases in frequency of write signals to achieve higher recording densities, it is required of the magnetic head that the write current flowing through the coil should exhibit a rapid rise. To meet such a requirement, it is effective to reduce the length of the magnetic path passing through the write shield, the return path section and the main pole. To achieve this, it is effective to reduce the distance between the medium facing surface and an end of the coil that is closest to the medium facing surface.

U.S. Pat. No. 8,385,019 B1 discloses a magnetic head having the following features. The magnetic head includes a main pole, a coil, a write shield and a return path section. The main pole, has a top surface including an inclined portion and a flat portion, the inclined portion being located closer to the medium facing surface than the flat portion. The inclined portion is inclined with respect to a direction perpendicular to the medium facing surface. The flat portion extends in a direction substantially perpendicular to the medium facing surface. The write shield includes a trailing shield. The coil includes a coil element located on the trailing side relative to the main pole, the coil element extending to pass through the space defined by the main pole, the trailing shield and the return path section. The coil element has a first inclined surface inclined with respect to the medium facing surface. The trailing shield has a second inclined surface. The second inclined surface includes a first portion opposed to the inclined portion of the top surface of the main pole, and a second portion opposed to the first inclined surface of the coil element. This magnetic head allows for a reduction in length of the magnetic path passing through the trailing shield, the return path section and the main pole.

However, the magnetic head disclosed in U.S. Pat. No. 8,385,019 B1 has room for improvement in the following respects. Specifically, in this magnetic head, the first inclined surface of the coil element and the inclined portion of the top surface of the main pole are formed simultaneously by ion beam etching such that they become located in one plane. In this case, the location and inclination angle of each of the first inclined surface of the coil element and the inclined portion of the top surface of the main pole vary easily in response to variations in conditions of ion beam etching. Variations in the location and inclination angle of the inclined portion vary the shape of the end face of the main pole and the shape of a portion of the main pole near the medium facing surface. Such variations in turn vary the write characteristics. Further, variations in the location and inclination angle of the first inclined surface vary the location of the end of the coil closest to the medium facing surface. This also results in variations in write characteristics.

In the magnetic head disclosed in U.S. Pat. No. 8,385,019 B1, as mentioned above, the first inclined surface of the coil element and the inclined portion of the top surface of the main pole are located in one plane. Due to this configuration, it is not possible for this magnetic head to achieve further reduction in length of the aforementioned magnetic path by further reducing the distance between the medium facing surface and the end of the coil closest to the medium facing surface.

OBJECT AND SUMMARY OF THE INVENTION

It is an object of the present invention to provide a magnetic head for perpendicular magnetic recording that is capable of preventing the occurrence of unwanted erasure induced by a skew, shortening the length of a magnetic path through the write shield, the return path section and the main pole, and suppressing variations in write characteristics, and to provide a method of manufacturing such a magnetic head.

A magnetic head for perpendicular magnetic recording of the present invention includes a medium facing surface configured to face a recording medium, a coil for producing a magnetic field corresponding to data to be written on the recording medium, a main pole, a write shield formed of a magnetic material, a gap section formed of a nonmagnetic material, and a first return path section formed of a magnetic material. The main pole has an end face located in the medium facing surface. The main pole is configured to pass a magnetic flux corresponding to the magnetic field produced by the coil, and to produce a write magnetic field for use to write data on the recording medium by means of a perpendicular magnetic recording system. The write shield has an end face located in the medium facing surface. The gap section is located between the main pole and the write shield. The first return path section is located on the front side in the direction of travel of the recording medium relative to the main pole.

The end face of the write shield includes a first end face portion located on the front side in the direction of travel of the recording medium relative to the end face of the main pole. The first return path section connects the write shield and part of the main pole located away from the medium facing surface to each other so that a first space is defined by the main pole, the gap section, the write shield and the first return path section. The coil includes at least one first coil element extending to pass through the first space.

The main pole has a top surface located at the front-side end of the main pole in the direction of travel of the recording medium. The top surface of the main pole includes an inclined portion and a flat portion, the inclined portion being located closer to the medium facing surface than the flat portion. The inclined portion has a first end located in the medium facing surface and a second end opposite to the first end. The inclined portion is inclined with respect to the medium facing surface and a direction perpendicular to the medium facing surface such that the second end is located on the front side in the direction of travel of the recording medium relative to the first end. The flat portion extends substantially perpendicular to the medium facing surface.

The at least one first coil element includes a specific coil element. The specific coil element has: a front end portion closest to the medium facing surface; a first inclined surface located on the front side in the direction of travel of the recording medium relative to the front end portion and contiguous with the front end portion; and a bottom surface facing the flat portion of the top surface of the main pole. The first inclined surface has a third end closest to the main pole, and a fourth end opposite to the third end. The first inclined surface is inclined with respect to the medium facing surface and the direction perpendicular to the medium facing surface such that the fourth end is located at a greater distance from the medium facing surface than is the third end. The third end is located on the front side in the direction of travel of the recording medium relative to the bottom surface of the specific coil element.

The write shield includes a top shield layer located on the front side in the direction of travel of the recording medium relative to the main pole and located closer to the medium facing surface than the specific coil element. The top shield layer has: a front end face constituting at least part of the first end face portion; a rear end face opposite to the front end face; a bottom surface opposed to the inclined portion of the top surface of the main pole with the gap section interposed therebetween; and a top surface opposite to the bottom surface.

The first return path section is connected to the top surface of the top shield layer and has a second inclined surface opposed to the first inclined surface of the specific coil element. The top shield layer is located on the rear side in the direction of travel of the recording medium relative to an imaginary plane including the first inclined surface of the specific coil element. The magnetic head further includes an insulating section formed of an insulating material, the insulating section being located in the first space and surrounding the at least one first coil element.

In the magnetic head of the present invention, the insulating section may include a first insulating film and a second insulating film. The first insulating film and the second insulating film are in contact with each other in the imaginary plane. The first insulating film is located on the rear side in the direction of travel of the recording medium relative to the imaginary plane, and extends to be in contact with the rear end face of the top shield layer and the front end portion and bottom surface of the specific coil element. The second insulating film extends to pass through between the first inclined surface and the second inclined surface.

The magnetic head of the present invention may further include a nonmagnetic section formed of a nonmagnetic material and interposed between the flat portion of the top surface of the main pole and the first insulating film. The nonmagnetic section has a top surface located at the front-side end of the nonmagnetic section in the direction of travel of the recording medium, and a front end face facing toward the medium facing surface and contiguous with the inclined portion.

In the magnetic head of the present invention, the top shield layer may be formed of a magnetic material having a saturation flux density higher than that of the magnetic material used to form at least part of the first return path section.

In the magnetic head of the present invention, the first return path section may include a first layer and a second layer each formed of a magnetic material, the magnetic material used to form the first layer and the magnetic material used to form the second layer being different from each other. The first layer connects the top shield layer and the main pole to each other. The second layer is stacked on the first layer. The magnetic material used to form the first layer may have a saturation flux density higher than that of the magnetic material used to form the second layer.

In the magnetic head of the present invention, the end face of the write shield may include a second end face portion located on the rear side in the direction of travel of the recording medium relative to the end face of the main pole. In this case, the magnetic head may further include a second return path section formed of a magnetic material and located on the rear side in the direction of travel of the recording medium relative to the main pole. The second return path section may connect the write shield and part of the main pole located away from the medium facing surface to each other so that a second space is defined by the main pole, the gap section, the write shield and the second return path section. The coil may include at least one second coil element extending to pass through the second space.

In the magnetic head of the present invention, the end face of the write shield may further include a third end face portion and a fourth end face portion. The third end face portion and the fourth end face portion are located on opposite sides of the end face of the main pole in the track width direction.

A method of manufacturing a magnetic head of the present invention is to manufacture the magnetic head of the present invention wherein the insulating section is formed to include the first insulating film and the second insulating film.

The method of manufacturing the magnetic head of the present invention includes the steps of: forming a magnetic layer; etching the magnetic layer so as to provide the magnetic layer with the inclined portion and the flat portion and thereby make the magnetic layer into the main pole; forming the gap section; forming an initial top shield layer after the main pole and the gap section are formed, the initial top shield layer having an initial rear end face that is greater than the rear end face of the top shield layer in length in the direction of travel of the recording medium, the initial top shield layer undergoing etching later to become the top shield layer; forming an initial first insulating film to be in contact with the initial rear end face after the initial top shield layer is formed; forming an initial coil which will later become the coil, the initial coil including an initial coil element located on the initial first insulating film; etching the initial coil element and the initial first insulating film so as to provide the initial coil element with the first inclined surface of the specific coil element and thereby make the initial coil element into the specific coil element, and to make the initial first insulating film into the first insulating film; forming the second insulating film to cover the first inclined surface of the specific coil element; and forming the first return path section. The step of forming the first return path section forms at least part of the first return path section after the second insulating film is formed, the at least part of the first return path section including the second inclined surface.

Where the magnetic head further includes the nonmagnetic section, the method of manufacturing the magnetic head of the present invention may further include the steps of: forming an initial nonmagnetic section on the magnetic layer; and etching the initial nonmagnetic section so as to provide the initial nonmagnetic section with the front end face of the nonmagnetic section and thereby make the initial nonmagnetic section into the nonmagnetic section.

In the magnetic head of the present invention, the top surface of the main pole includes the inclined portion. The specific coil element has the front end portion and the first inclined surface contiguous with the front end portion. The write shield includes the top shield layer. The top shield layer is located on the rear side in the direction of travel of the recording medium relative to an imaginary plane including the first inclined surface of the specific coil element. By virtue of such a configuration, the present invention makes it possible to prevent the occurrence of unwanted erasure induced by a skew, shorten the length of the magnetic path through the write shield, the return path section and the main pole, and suppress variations in write characteristics.

Other objects, features and advantages of the present invention will become fully apparent from the following description.

DETAILED DESCRIPTION OF THE PREFERRED EMBODIMENTS

First Embodiment

Figure 2:
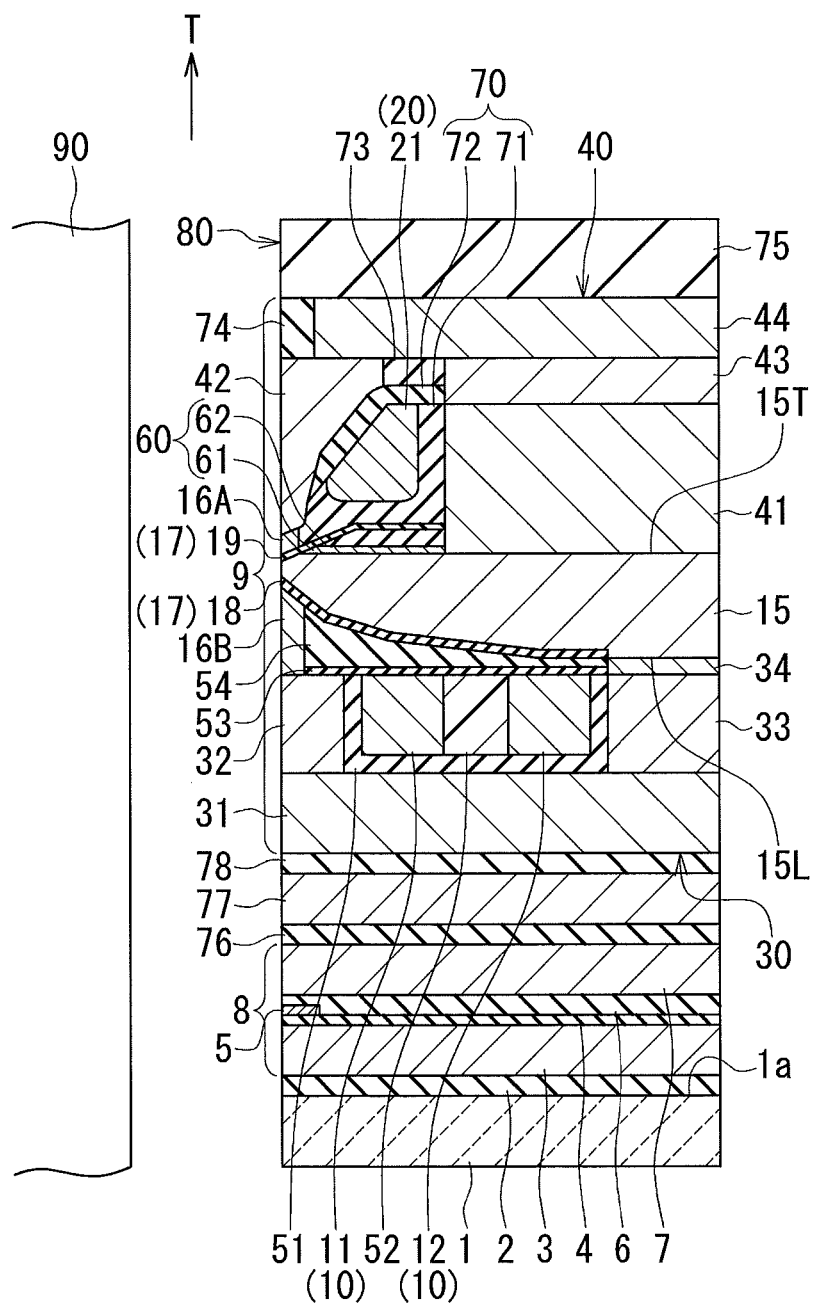
FIG. 2 is a cross-sectional view of the magnetic head according to the first embodiment of the invention.
Figure 3:
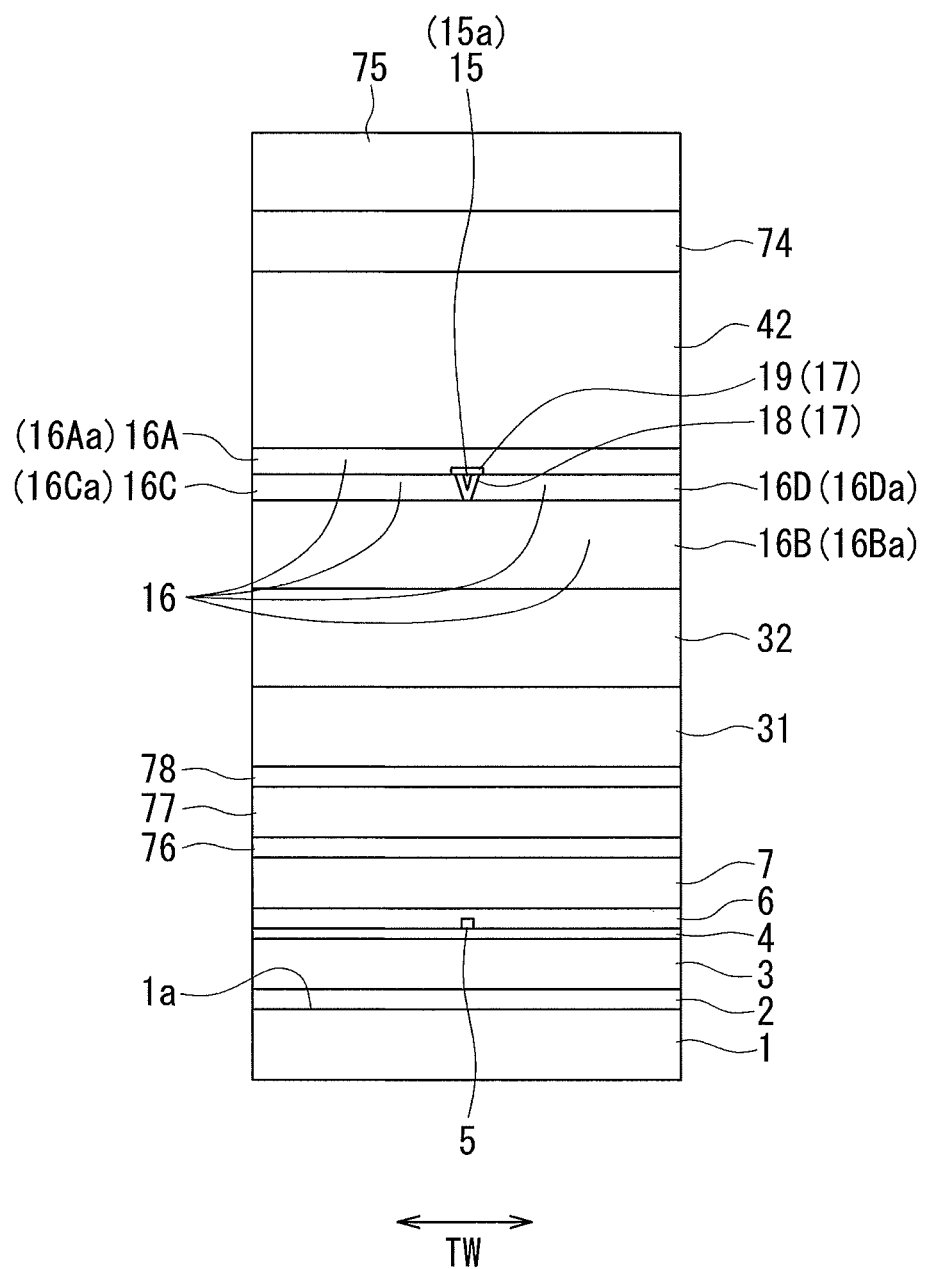
FIG. 3 is a front view showing the medium facing surface of the magnetic head according to the first embodiment of the invention.
Figure 4:
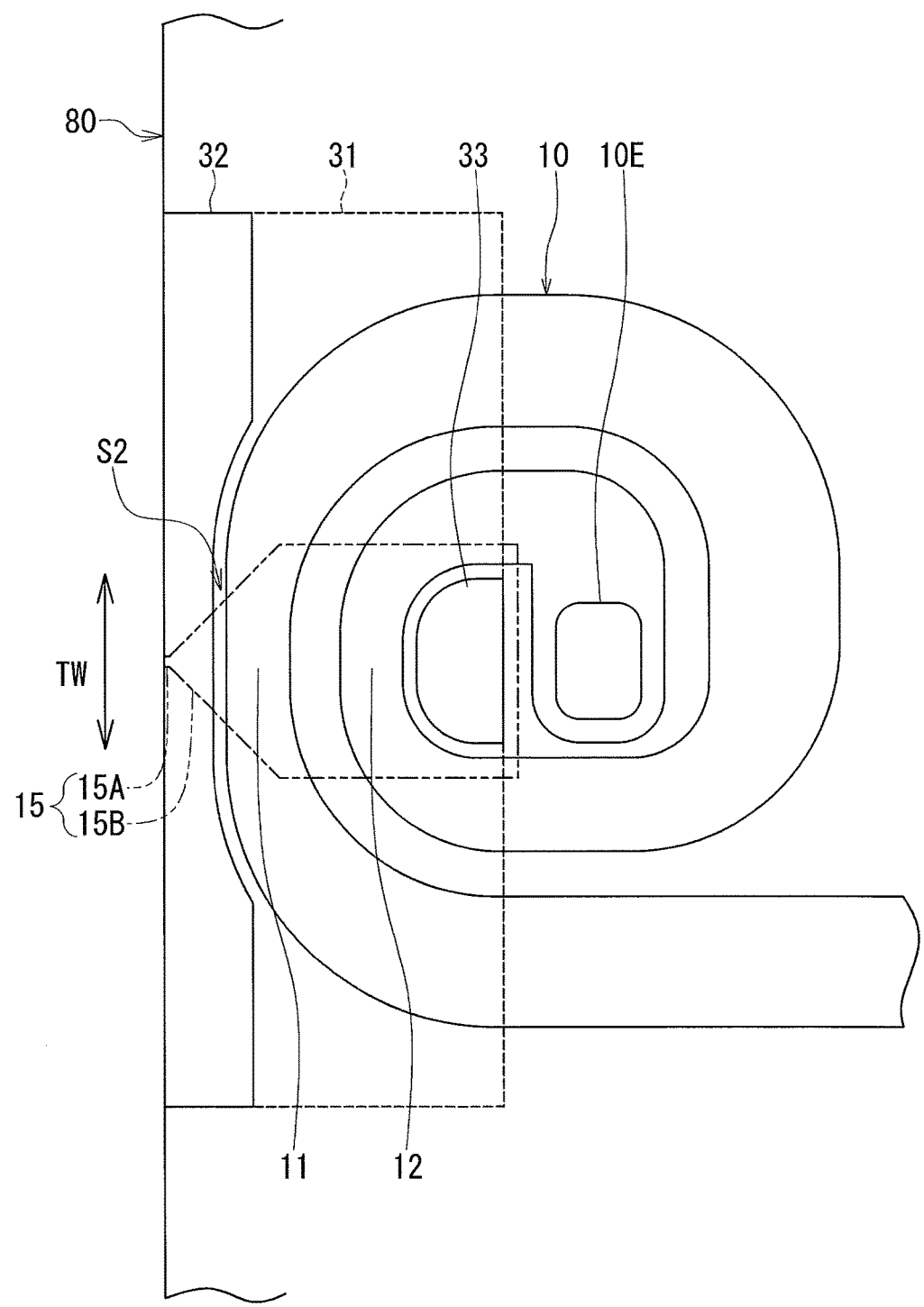
FIG. 4 is a plan view showing a second coil of the magnetic head according to the first embodiment of the invention.
Figure 5:
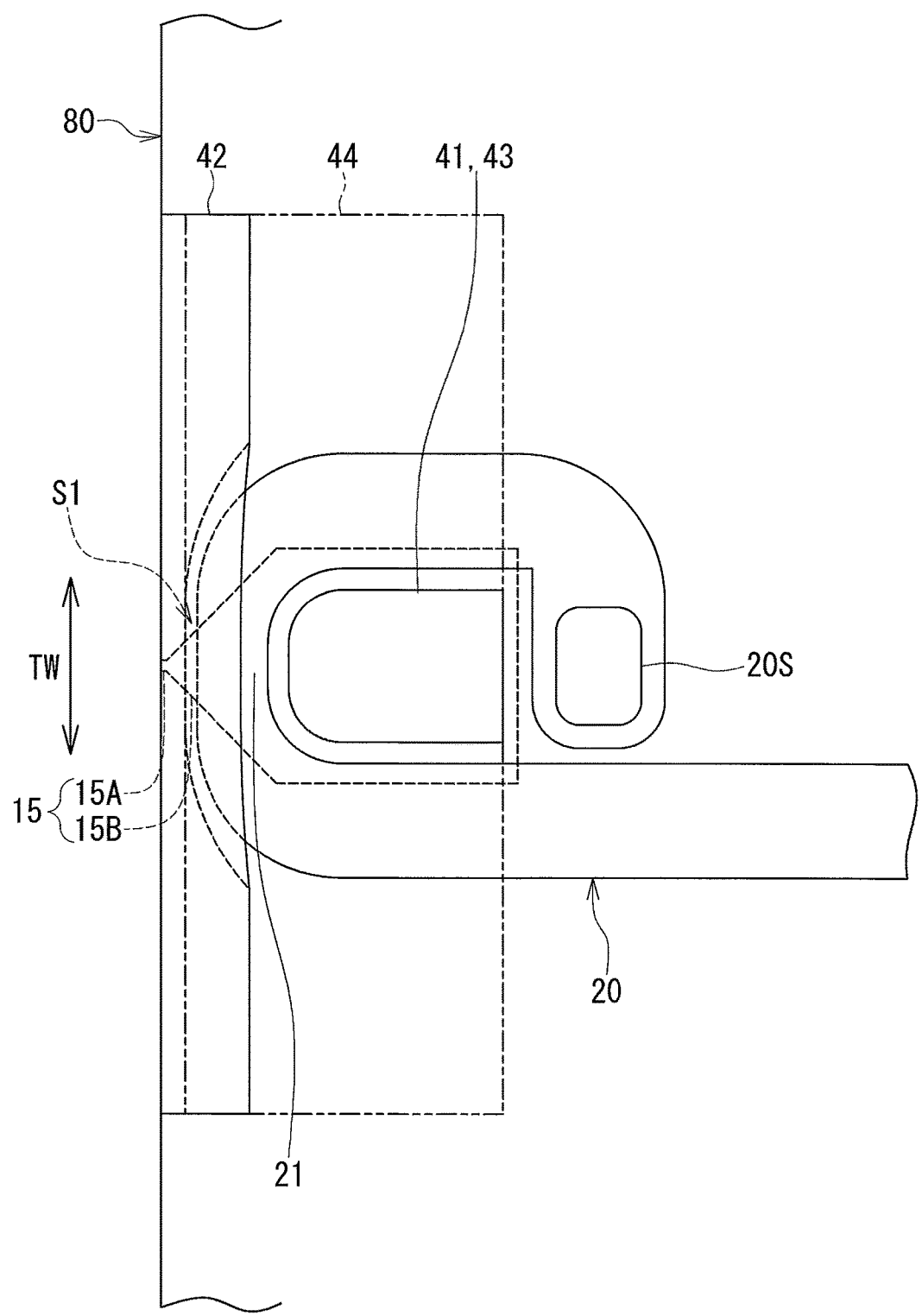
FIG. 5 is a plan view showing a first coil of the magnetic head according to the first embodiment of the invention.

Preferred embodiments of the present invention will now be described in detail with reference to the drawings. First, reference is made to FIG. 2 to FIG. 5 to describe the configuration of a magnetic head for perpendicular magnetic recording (hereinafter simply referred to as magnetic head) according to a first embodiment of the invention. FIG. 2 is a cross-sectional view of the magnetic head according to the present embodiment. The arrow labeled T in FIG. 2 indicates the direction of travel of a recording medium. FIG. 3 is a front view showing the medium facing surface of the magnetic head according to the present embodiment. FIG. 4 is a plan view showing a second coil of the magnetic head according to the present embodiment. FIG. 5 is a plan view showing a first coil of the magnetic head according to the present embodiment. The arrow labeled TW in FIGS. 3 to 5 indicates the track width direction.

The magnetic head according to the present embodiment is for use in, for example, a magnetic disk drive, and is incorporated in a slider configured to fly over the surface of a rotating recording medium 90. The slider has a medium facing surface 80 configured to face the recording medium 90. The medium facing surface 80 has an air inflow end (a leading end) and an air outflow end (a trailing end). An airflow that comes from the leading end into the space between the medium facing surface 80 and the recording medium 90 causes the slider to slightly fly over the surface of the recording medium 90.

Here, the side of the positions closer to the leading end relative to a reference position will be referred to as the leading side, and the side of the positions closer to the trailing end relative to the reference position will be referred to as the trailing side. The leading side is the rear side in the direction T of travel of the recording medium 90 relative to the slider. The trailing side is the front side in the direction T of travel of the recording medium 90 relative to the slider.

As shown in FIG. 2, the magnetic head has the medium facing surface 80 mentioned above. As shown in FIGS. 2 and 3, the magnetic head includes: a formed of a ceramic material such as aluminum oxide-titanium carbide ($Al_2O_3$—TiC) and having a top surface 1a; an insulating layer 2 formed of an insulating material such as alumina ($Al_2O_3$) and disposed on the top surface 1a of the substrate 1; a first read shield layer 3 formed of a magnetic material and disposed on the insulating layer 2; a first read shield gap film 4 which is an insulating film disposed to cover the first read shield layer 3; a magnetoresistive (MR) element 5 serving as a read element disposed on the first read shield gap film 4; a second read shield gap film 6 which is an insulating film disposed on the MR element 5; and a second read shield layer 7 formed of a magnetic material and disposed on the second read shield gap film 6.

An end of the MR element 5 is located in the medium facing surface 80. The MR element 5 may be an element formed of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current for use in magnetic signal detection is fed in a direction generally parallel to the plane of layers constituting the GMR element or the current-perpendicular-to-plane (CPP) type in which the current for use in magnetic signal detection is fed in a direction generally perpendicular to the plane of the layers constituting the GMR element.

The parts from the first read shield layer 3 to the second read shield layer 7 constitute a read head unit 8. The magnetic head further includes: a nonmagnetic layer 76 formed of a nonmagnetic material and disposed on the second read shield layer 7; a middle shield layer 77 formed of a magnetic material and disposed on the nonmagnetic layer 76; a nonmagnetic layer 78 formed of a nonmagnetic material and disposed on the middle shield layer 77; and a write head unit 9 disposed on the nonmagnetic layer 78. The middle shield layer 77 has the function of shielding the MR element 5 from magnetic fields generated in the write head unit 9. The nonmagnetic layers 76 and 78 are formed of alumina, for example.

The write head unit 9 includes a first coil 20, a second coil 10, a main pole 15, a write shield 16, and a gap section 17. The first and second coils 20 and 10 produce magnetic fields corresponding to data to be written on the recording medium 90. Each of the first and second coils 20 and 10 is formed of a conductive material such as copper. The first coil 20 and the second coil 10 are connected in series or in parallel. The main pole 15 has an end face 15a located in the medium facing surface 80. The main pole 15 passes magnetic fluxes corresponding to the magnetic fields produced by the first and second coils 20 and 10, and produces a write magnetic field for use to write data on the recording medium 90 by means of a perpendicular magnetic recording system. FIG. 2 shows a cross section that intersects the end face 15a of the main pole 15 and that is perpendicular to the medium facing surface 80 and to the top surface 1a of the substrate 1. Such a cross section will hereinafter be referred to as the main cross section.

The write shield 16 has an end face located in the medium facing surface 80. The end face of the write shield 16 includes first to fourth end face portions 16Aa, 16Ba, 16Ca, and 16Da. The first end face portion 16Aa is located on the trailing side, i.e., the front side in the direction T of travel of the recording medium 90, relative to the end face 15a of the main pole 15. The second end face portion 16Ba is located on the leading side, i.e., the rear side in the direction T of travel of the recording medium 90, relative to the end face 15a of the main pole 15. The third and fourth end face portions 16Ca and 16Da are located on opposite sides of the end face 15a of the main pole 15 in the track width direction TW. In the medium facing surface 80, the first to fourth end face portions 16Aa, 16Ba, 16Ca, and 16Da are arranged to surround the end face 15a of the main pole 15.

The write shield 16 is formed of a magnetic material. For example, one of CoFeN, CoNiFe, FeNi, and CoFe can be used as the material of the write shield 16.

The write head unit 9 further includes a first return path section 40 and a second return path section 30. Each of the first return path section 40 and the second return path section 30 is formed of a magnetic material. The first return path section 40 and the second return path section 30 are adjacent to each other in a direction perpendicular to the top surface 1a of the substrate 1 with the main pole 15 interposed therebetween. The first return path section 40 is located on the trailing side, i.e., the front side in the direction T of travel of the recording medium 90, relative to the main pole 15, and connects the write shield 16 and part of the main pole 15 located away from the medium facing surface 80 to each other, thereby magnetically coupling the write shield 16 and the main pole 15 to each other. The second return path section 30 is located on the leading side, i.e., the rear side in the direction T of travel of the recording medium 90, relative to the main pole 15, and connects the write shield 16 and part of the main pole 15 located away from the medium facing surface 80 to each other, thereby magnetically coupling the write shield 16 and the main pole 15 to each other.

The write head unit 9 further includes magnetic layers 31, 32, 33 and 34 constituting the second return path section 30, each of the magnetic layers 31 to 34 being formed of a magnetic material. Examples of materials that can be used for the magnetic layers 31 to 34 include CoFeN, CoNiFe, FeNi, and CoFe. The magnetic layer 31 is located on the nonmagnetic layer 78. The magnetic layers 32 and 33 are both located on the magnetic layer 31. The magnetic layer 32 is located near the medium facing surface 80. The magnetic layer 33 is located farther from the medium facing surface 80 than is the magnetic layer 32. Each of the magnetic layers 31 and 32 has an end face located in the medium facing surface 80.

As shown in FIG. 4, the second coil 10 is wound around the magnetic layer 33. The write head unit 9 further includes: a first insulating layer (not illustrated) formed of an insulating material, lying on the nonmagnetic layer 78 and surrounding the magnetic layer 31; an insulating film 51 formed of an insulating material and separating the second coil 10 from the magnetic layers 31 to 33; an insulating layer 52 formed of an insulating material and disposed in the space between adjacent turns of the second coil 10; and a second insulating layer (not illustrated) formed of an insulating material and disposed around the second coil 10 and the magnetic layer 32. The top surfaces of the second coil 10, the magnetic layers 32 and 33, the insulating film 51, the insulating layer 52 and the second insulating layer are even with each other. The insulating film 51, the first insulating layer and the second insulating layer are formed of alumina, for example. The insulating layer 52 is formed of a photoresist, for example.

As shown in FIG. 3, the write shield 16 includes a top shield layer 16A, a bottom shield layer 16B, and two side shield layers 16C and 16D. The top shield layer 16A is located on the trailing side, i.e., the front side in the direction T of travel of the recording medium 90, relative to the main pole 15. The bottom shield layer 16B is located on the leading side, i.e., the rear side in the direction T of travel of the recording medium 90, relative to the main pole 15. The two side shield layers 16C and 16D are located on opposite sides of the main pole 15 in the track width direction TW and magnetically couple the top shield layer 16A and the bottom shield layer 16B to each other.

As shown in FIG. 3, the top shield layer 16A has a front end face constituting at least part of the first end face portion 16Aa. In the present embodiment, the whole of the first end face portion 16Aa is constituted by the front end face of the top shield layer 16A. Hereinafter, the front end face of the top shield layer 16A will also be referred to as the front end face 16Aa. The bottom shield layer 16B has the second end face portion 16Ba. The side shield layer 16C has the third end face portion 16Ca. The side shield layer 16D has the fourth end face portion 16Da.

The bottom shield layer 16B lies on the magnetic layer 32. The magnetic layer 34 lies on the magnetic layer 33. The write head unit 9 further includes an insulating layer 53 formed of an insulating material, and a nonmagnetic layer 54 formed of a nonmagnetic material. The insulating layer 53 lies over the top surfaces of the second coil 10, the insulating film 51, the insulating layer 52 and the second insulating layer, and a portion of the top surface of the magnetic layer 32. The nonmagnetic layer 54 lies on the insulating layer 53 and surrounds the bottom shield layer 16B and the magnetic layer 34. The insulating layer 53 and the nonmagnetic layer 54 are formed of alumina, for example.

The side shield layers 16C and 16D are disposed on the bottom shield layer 16B. The main pole 15 has: the end face 15a; a top surface 15T (see FIG. 2) located at the trailing-side end of the main pole 15, i.e., the front-side end of the main pole 15 in the direction T of travel of the recording medium 90; a bottom end 15L (see FIG. 2) opposite to the top surface 15T; and a first side portion and a second side portion (see FIG. 3) opposite to each other in the track width direction TW. The side shield layer 16C has a first sidewall opposed to the first side portion of the main pole 15. The side shield layer 16D has a second sidewall opposed to the second side portion of the main pole 15.

The gap section 17 is located between the main pole 15 and the write shield 16. The write head unit 9 further includes a first gap layer 18 formed of a nonmagnetic material and including a portion that constitutes a portion of the gap section 17, and a second gap layer 19 formed of a nonmagnetic material and including a portion that constitutes another portion of the gap section 17. The portion of the first gap layer 18 constituting the portion of the gap section 17 is located between the main pole 15 and each of the bottom shield layer 16B and the side shield layers 16C and 16D. The portion of the second gap layer 19 constituting the other portion of the gap section 17 is located between the main pole 15 and the top shield layer 16A.

The first gap layer 18 is disposed to extend along the first and second sidewalls of the side shield layers 16C and 16D, the top surface of the bottom shield layer 16B and the top surface of the nonmagnetic layer 54. The nonmagnetic material used to form the first gap layer 18 may be an insulating material or a nonmagnetic metal material. Alumina is an example of an insulating material that can be used to form the first gap layer 18. Ru is an example of a nonmagnetic metal material that can be used to form the first gap layer 18.

A portion of the main pole 15 lies above the top surfaces of the bottom shield layer 16B and the nonmagnetic layer 54. The first gap layer 18 is interposed between the portion of the main pole 15 and the top surfaces of the bottom shield layer 16B and the nonmagnetic layer 54. As shown in FIG. 3, the first gap layer 18 is interposed also between the first side portion of the main pole 15 and the first sidewall of the side shield layer 16C, and between the second side portion of the main pole 15 and the second sidewall of the side shield layer 16D.

The bottom end 15L of the main pole 15 is in contact with the top surface of the magnetic layer 34 at a location away from the medium facing surface 80. The main pole 15 is formed of a ferromagnetic material containing one or more elements selected from the group consisting of Ni, Fe and Co, such as FeNi, CoNiFe, or CoFe. The shape of the main pole 15 will be described in detail later.

The write head unit 9 further includes a first nonmagnetic layer (not illustrated) formed of a nonmagnetic material and disposed around the main pole 15 and the side shield layers 16C and 16D. The first nonmagnetic layer is formed of alumina, for example.

The write head unit 9 further includes a nonmagnetic section 60 formed of nonmagnetic material and lying on the top surface 15T of the main pole 15. The nonmagnetic section 60 includes a first nonmagnetic layer 61 and a second nonmagnetic layer 62. The first nonmagnetic layer 61 lies on a first portion of the top surface 15T of the main pole 15, the first portion being located away from the medium facing surface 80. The second nonmagnetic layer 62 lies on the top surface of the first nonmagnetic layer 61. The first nonmagnetic layer 61 is formed of a nonmagnetic metal material such as Ru, NiCr or NiCu. The second nonmagnetic layer 62 is formed of a nonmagnetic insulating material such as alumina.

The second gap layer 19 is disposed to cover the main pole 15, the first nonmagnetic layer 61 and the second nonmagnetic layer 62. The material of the second gap layer 19 may be a nonmagnetic insulating material such as alumina, or a nonmagnetic conductive material such as Ru, NiCu, Ta, W, NiB, or NiP.

The top shield layer 16A lies on the side shield layers 16C and 16D and the second gap layer 19, being in contact with the top surfaces of the side shield layers 16C and 16D and the second gap layer 19. In the medium facing surface 80, a portion of the front end face 16Aa (the first end face portion 16Aa) of the top shield layer 16A is spaced from the end face 15a of the main pole 15 by a predetermined distance created by the thickness of the second gap layer 19. The thickness of the second gap layer 19 preferably falls within the range of 5 to 60 nm, and may be 30 to 60 nm, for example. The end face 15a of the main pole 15 has a side in contact with the second gap layer 19. This side of the end face 15a defines the track width.

The write head unit 9 further includes magnetic layers 41, 42, 43 and 44 constituting the first return path section 40, each of the magnetic layers 41 to 44 being formed of a magnetic material. Examples of materials that can be used for the magnetic layers 41 to 44 include CoFeN, CoNiFe, FeNi, and CoFe. The magnetic layer 41 lies on a second portion of the top surface 15T of the main pole 15, the second portion being located away from the medium facing surface 80. The second portion of the top surface 15T of the main pole 15 is located farther from the medium facing surface 80 than is the first portion of the top surface 15T of the main pole 15.

As shown in FIG. 5, the first coil 20 is wound around the magnetic layer 41. The write head unit 9 further includes: a first insulating film 71 formed of an insulating material and separating at least part of the first coil 20 from the top shield layer 16A, the second gap layer 19 and the magnetic layer 41; a second insulating film 72 formed of an insulating material and disposed to cover at least part of the first coil 20 and the first insulating film 71; and a second nonmagnetic layer (not illustrated) formed of a nonmagnetic material and disposed around the top shield layer 16A and the first coil 20. The first and second insulating films 71 and 72 and the second nonmagnetic layer are formed of alumina, for example.

The magnetic layer 42 lies on the top shield layer 16A, the first insulating film 71 and the second insulating film 72. The magnetic layer 43 lies on the magnetic layer 41. The magnetic layer 42 has an end face located in the medium facing surface 80. The write head unit 9 further includes a nonmagnetic layer 73 formed of a nonmagnetic material and disposed around the magnetic layers 42 and 43. The nonmagnetic layer 73 is formed of alumina, for example.

The magnetic layer 44 lies on the magnetic layers 42 and 43 and the nonmagnetic layer 43, and connects the magnetic layers 42 and 43 to each other. The magnetic layer 44 has an end face facing toward the medium facing surface 80 and located at a distance from the medium facing surface 80. The write head unit 9 further includes a nonmagnetic layer 74 formed of a nonmagnetic material and disposed around the magnetic layer 44. The nonmagnetic layer 74 is formed of alumina, for example.

The magnetic head further includes a protective layer 75 formed of a nonmagnetic material and disposed to cover the write head unit 9. The protective layer 75 is formed of, for example, an inorganic insulating material such as alumina.

As has been described, the magnetic head according to the present embodiment includes the medium facing surface 80, the read head unit 8, and the write head unit 9. The read head unit 8 and the write head unit 9 are stacked on the substrate 1. The write head unit 9 is located on the front side in the direction T of travel of the recording medium 90 relative to the read head unit 8.

The write head unit 9 includes the first and second coils 20 and 10, the main pole 15, the write shield 16, the gap section 17, the first and second return path sections 40 and 30, and the nonmagnetic section 60. The write shield 16 includes the top shield layer 16A, the bottom shield layer 16B and the two side shield layers 16C and 16D. The gap section 17 is constituted by a portion of the first gap layer 18 and a portion of the second gap layer 19. Since the first and second gap layers 18 and 19 are both formed of nonmagnetic material, the gap section 17 is formed of nonmagnetic material.

The first return path section 40 is constituted by the magnetic layers 41 to 44. The first return path section 40 is located on the trailing side, i.e., the front side in the direction T of travel of the recording medium 90 relative to the main pole 15, and connects the write shield 16 and part of the main pole 15 located away from the medium facing surface 80 to each other so that a first space S1 is defined by the main pole 15, the gap section 17 (the gap layer 19), the write shield 16 and the first return path section 40 (the magnetic layers 41 to 44). The first coil 20 passes through the first space S1.

The second return path section 30 is constituted by the magnetic layers 31 to 34. The second return path section 30 is located on the leading side, i.e., the rear side in the direction T of travel of the recording medium 90 relative to the main pole 15, and connects the write shield 16 and part of the main pole 15 located away from the medium facing surface 80 to each other so that a second space S2 is defined by the main pole 15, the gap section 17 (the gap layer 18), the write shield 16 and the second return path section 30 (the magnetic layers 31 to 34). The second coil 10 passes through the second space S2.

The write shield 16 captures a disturbance magnetic field applied to the magnetic head from the outside thereof. This makes it possible to prevent the disturbance magnetic field from being intensively captured into the main pole 15 and thereby causing erroneous writing on the recording medium 90. The write shield 16 also has the function of capturing a magnetic flux that is produced from the end face 15a of the main pole 15 and spreads in directions other than the direction perpendicular to the plane of the recording medium 90, and thereby preventing the magnetic flux from reaching the recording medium 90. Furthermore, the write shield 16 and the first and second return path sections 40 and 30 have the function of allowing a magnetic flux that has been produced from the end face 15a of the main pole 15 and has magnetized a portion of the recording medium 90 to flow back.

Reference is now made to FIG. 4 and FIG. 5 to describe the configurations of the first and second coils 20 and 10. As shown in FIG. 4, the second coil 10 is wound approximately twice around the magnetic layer 33. The second coil 10 includes at least one second coil element extending to pass through the second space S2. A coil element refers to a portion of the winding of a coil. In the present embodiment, the second coil 10 includes two second coil elements 11 and 12 extending to pass through the second space S2, particularly through between the magnetic layer 32 and the magnetic layer 33. The second coil elements 11 and 12 are adjacent to each other in the direction perpendicular to the medium facing surface 80, the coil element 11 being located closer to the medium facing surface 80 than the coil element 12. The second coil 10 has a coil connection 10E electrically connected to the first coil 20.

As shown in FIG. 5, the first coil 20 is wound approximately once around the magnetic layer 41. The first coil 20 includes at least one first coil element extending to pass through the first space S1. In the present embodiment, the first coil 20 includes a first coil element 21 extending to pass through the first space S1, particularly through between the magnetic layer 42 and the magnetic layer 41.

The first coil 20 has a coil connection 20S electrically connected to the coil connection 10E of the second coil 10. The coil connection 20S is electrically connected to the coil connection 10E via first and second connection layers of columnar shape (not illustrated) that penetrate a plurality of layers interposed between the first coil 20 and the second coil 10. The first connection layer and the second connection layer are stacked in this order on the coil connection 10E. The coil connection 20S lies on the second connection layer. The first and second connection layers are each formed of a conductive material such as copper. In the example shown in FIGS. 4 and 5, the first coil 20 and the second coil 10 are connected in series.

Figure 1:
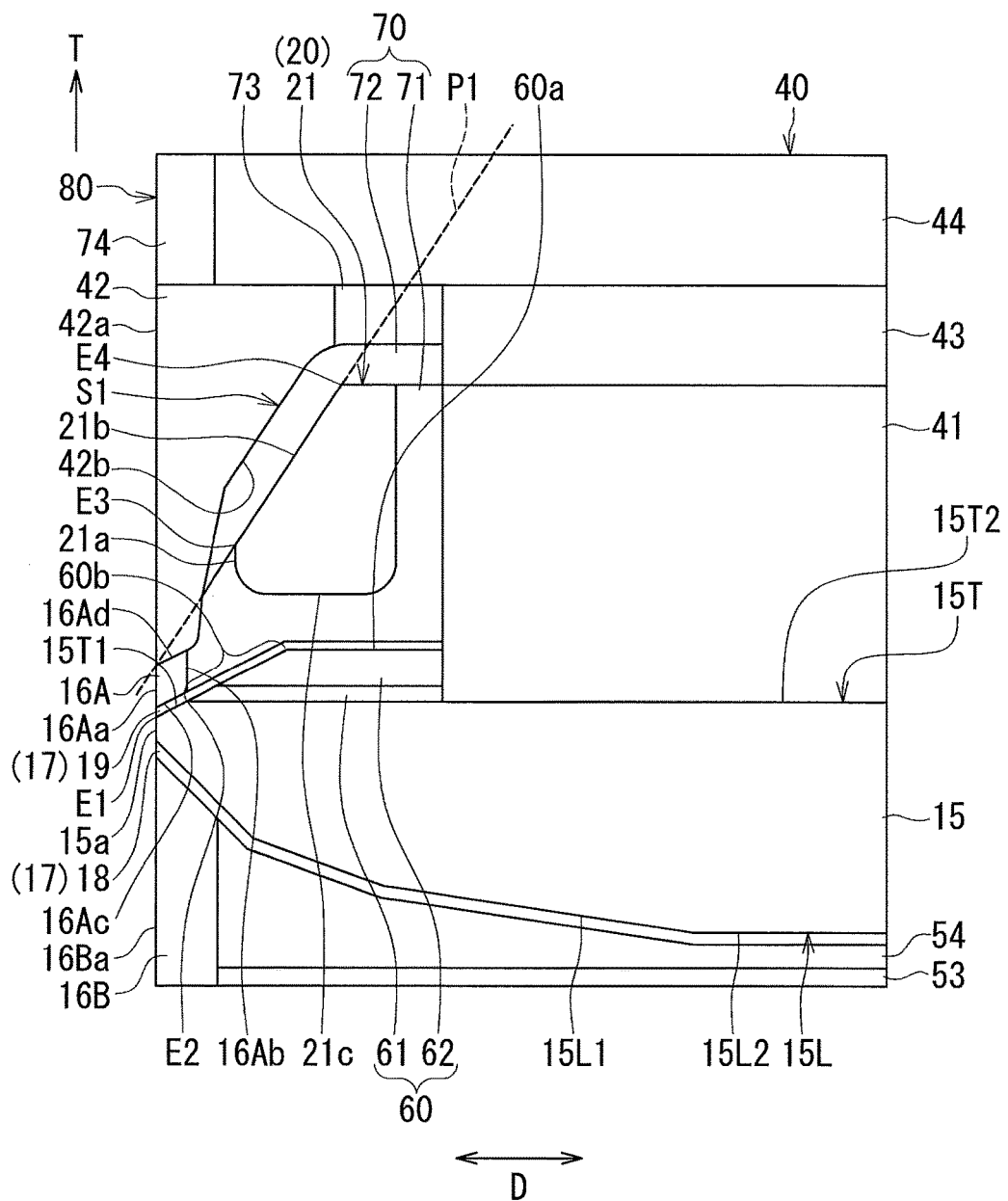
FIG. 1 is a cross-sectional view showing the main part of a magnetic head according to a first embodiment of the invention.

The configuration of the magnetic head according to the present embodiment will now be described in more detail. First, the shape of the main pole 15 will be described in detail with reference to FIG. 1 and FIGS. 3 to 5. FIG. 1 is a cross-sectional view showing the main part of the magnetic head according to the present embodiment. FIG. 1 shows the main cross section. As shown in FIGS. 4 and 5, the main pole 15 includes a track width defining portion 15A and a wide portion 15B. The track width defining portion 15A has the end face 15a and an end opposite to the end face 15a. The wide portion 15B is connected to the end of the track width defining portion 15A. The main pole 15 has the top surface 15T, the bottom end 15L, the first side portion and the second side portion. The width of the top surface 15T in the track width direction TW is greater in the wide portion 15B than in the track width defining portion 15A.

In the track width defining portion 15A, the width of the top surface 15T in the track width direction TW is generally constant regardless of distance from the medium facing surface 80. In the wide portion 15B, the width of the top surface 15T in the track width direction TW is, for example, equal to that in the track width defining portion 15A at the boundary between the track width defining portion 15A and the wide portion 15B, and gradually increases with increasing distance from the medium facing surface 80, then becoming constant. The length of the track width defining portion 15A in the direction perpendicular to the medium facing surface 80 will be referred to as the neck height. The neck height falls within the range of 0 to 0.3 µm, for example. A zero neck height means that the track width defining portion 15A is not present and the wide portion 15B thus has the end face 15a.

As shown in FIG. 1, the top surface 15T includes an inclined portion 15T1 and a flat portion 15T2, the inclined portion 15T1 being located closer to the medium facing surface 80 than the flat portion 15T2. The inclined portion 15T1 has a first end E1 located in the medium facing surface 80 and a second end E2 opposite to the first end E1. The flat portion 15T2 is connected to the second end E2 of the inclined portion 15T1.

The inclined portion 15T1 is inclined with respect to the medium facing surface 80 and the direction perpendicular to the medium facing surface 80 such that the second end E2 is located on the front side in the direction T of travel of the recording medium 90 relative to the first end E1. In FIG. 1, the arrow labeled D indicates the direction perpendicular to the medium facing surface 80. The flat portion 15T2 extends substantially in the direction D perpendicular to the medium facing surface 80.

As shown in FIG. 1, the bottom end 15L includes an inclined portion 15L1 and a flat portion 15L2, the inclined portion 15L1 being located closer to the medium facing surface 80 than the flat portion 15L2. The inclined portion 15L1 has a first end located in the medium facing surface 80 and a second end opposite to the first end. The inclined portion 15L1 may be an edge formed by two intersecting planes, or may be a plane connecting two planes to each other. The flat portion 15L2 is a plane connected to the second end of the inclined portion 15L1. The inclined portion 15L1 is inclined with respect to the medium facing surface 80 and the direction D perpendicular to the medium facing surface 80 such that its second end is located on the rear side in the direction T of travel of the recording medium 90 relative to its first end. The flat portion 15L2 extends substantially in the direction D perpendicular to the medium facing surface 80.

As shown in FIG. 3, the end face 15a of the main pole 15 has a first side in contact with the second gap layer 19, a second side connected to one end of the first side, and a third side connected to the other end of the first side. The first side defines the track width. The position of an end of a record bit to be recorded on the recording medium 90 is determined by the position of the first side. The width of the end face 15a of the main pole 15 in the track width direction TW decreases with increasing distance from the first side, that is, with decreasing distance to the top surface 1a of the substrate 1. Each of the second side and the third side forms an angle of, for example, 7° to 17°, or preferably 10° to 15°, with respect to the direction perpendicular to the top surface 1a of the substrate 1. The first side has a length in the range of 0.05 to 0.20 µm, for example.

The first coil 20 and the first coil element 21 will now be described in detail with reference to FIG. 1. The first coil 20 includes at least one first coil element. The at least one first coil element includes a specific coil element. In the present embodiment, the first coil 20 includes one first coil element 21, and the first coil element 21 is the specific coil element. As shown in FIG. 1, the specific coil element 21 includes: a front end portion 21a located closest to the medium facing surface 80; a first inclined surface 21b located on the trailing side, i.e., the front side in the direction T of travel of the recording medium 90 relative to the front end portion 21a and contiguous with the front end portion 21a; and a bottom surface 21c facing the flat portion 15T2 of the top surface 15T of the main pole 15. The front end portion 21a is located at a distance of, for example, 0.15 to 0.25 µm from the medium facing surface 80.

The first inclined surface 21b has a third end E3 closest to the main pole 15, and a fourth end E4 opposite to the third end E3. The first inclined surface 21b is inclined with respect to the medium facing surface 80 and the direction D perpendicular to the medium facing surface 80 such that the fourth end E4 is located at a greater distance from the medium facing surface 80 than is the third end E3. The third end E3 is located on the front side in the direction T of travel of the recording medium 90 relative to the bottom surface 21c of the specific coil element 21.

The top shield layer 16A, the first return path section 40, the magnetic layer 42, the first insulating film 71, the second insulating film 72 and the nonmagnetic section 60 will now be described in detail. As shown in FIG. 1, the top shield layer 16A is located on the trailing side, i.e., the front side in the direction T of travel of the recording medium 90 relative to the main pole 15, and is located closer to the medium facing surface 80 than is the specific coil element 21. The top shield layer 16A has the front end face 16Aa mentioned previously, and further has a rear end face 16Ab opposite to the front end face 16Aa, a bottom surface 16Ac, and a top surface 16Ad opposite to the bottom surface 16Ac. The bottom surface 16Ac is opposed to the inclined portion 15T1 of the top surface 15T of the main pole 15 with the second gap layer 19 constituting part of the gap section 17 interposed therebetween.

As shown in FIG. 1, let us assume an imaginary plane P1 including the first inclined surface 21b of the specific coil element 21. The top shield layer 16A is located on the leading side, i.e., the rear side in the direction T of travel of the recording medium 90, relative to the imaginary plane P1.

The front end face 16Aa of the top shield layer 16A is, for example, 0.1 to 0.3 µm in length in the direction T of travel of the recording medium 90. The top shield layer 16A is, for example, 0.05 to 0.1 µm in length in the direction D perpendicular to the medium facing surface 80.

The top shield layer 16A may be formed of a magnetic material the same as that used to form at least part of the first return path section 40. However, it is preferred that the top shield layer 16A be formed of a magnetic material having a saturation flux density higher than that of the magnetic material used to form at least part of the first return path section 40. For example, the magnetic material used to form the top shield layer 16A may be CoNiFe or CoFe having a saturation flux density of approximately 2.4 T, and the magnetic material used to form the magnetic layers 42 to 44 constituting part of the first return path section 40 may be FeNi having a saturation flux density of approximately 1.9 T. The magnetic layer 41 constituting the remainder of the first return path section 40 may be formed of the same magnetic material as that used to form the top shield layer 16A or that used to form the magnetic layers 42 to 44.

As shown in FIG. 1, the magnetic layer 42 is connected to the top surface 16Ad of the top shield layer 16A, and has an end face 42a located in the medium facing surface 80 and a second inclined surface 42b opposed to the first inclined surface 21b of the specific coil element 21. Since the magnetic layer 42 constitutes part of the first return path section 40, the first return path section 40 can be said to be connected to the top surface 16Ad of the top shield layer 16A and have the second inclined surface 42b. The second inclined surface 42b is inclined with respect to the medium facing surface 80 and the direction D perpendicular to the medium facing surface 80 in such a manner as to become parallel or almost parallel to the first inclined surface 21b of the specific coil element 21.

The length of the magnetic layer 42 in the direction D perpendicular to the medium facing surface 80 is greater than the length of the top shield layer 16A in the direction D, and increases with increasing distance from the top shield layer 16A.

As shown in FIG. 1, the magnetic head includes an insulating section 70 formed of an insulating material. The insulating section 70 is located in the first space S1 and surrounds the at least one first coil element. In the present embodiment, the insulating section 70 surrounds the first coil element 21.

In the present embodiment, the insulating section 70 includes the first insulating film 71 and the second insulating film 72 mentioned previously. The first insulating film 71 and the second insulating film 72 are in contact with each other in the imaginary plane P1. The first insulating film 71 is located on the leading side, i.e., the rear side in the direction T of travel of the recording medium 90 relative to the imaginary plane P1, and extends to be in contact with the rear end face 16Ab of the top shield layer 16A and the front end portion 21a and bottom surface 21c of the specific coil element 21. The first insulating film 71 further extends to pass through between the specific coil element 21 and the magnetic layer 41. The second insulating film 72 extends to pass through between the first inclined surface 21b and the second inclined surface 42b.

As shown in FIG. 1, the nonmagnetic section 60 is interposed between the first insulating film 71 and the flat portion 15T2 of the top surface 15T of the main pole 15. The nonmagnetic section 60 has a top surface 60a and a front end face 60b. The top surface 60a is located at the trailing-side end of the nonmagnetic section 60, that is, the front-side end of the nonmagnetic section 60 in the direction T of travel of the recording medium 90. The front end face 60b faces toward the medium facing surface 80 and is contiguous with the inclined portion 15T1. In the present embodiment, the top surface 60a of the nonmagnetic section 60 is constituted by the top surface of the second nonmagnetic layer 62. The front end face 60b of the nonmagnetic section 60 is constituted by the end face of the first nonmagnetic layer 61 facing toward the medium facing surface 80 and the end face of the second nonmagnetic layer 62 facing toward the medium facing surface 80.

The specific function and effects of the magnetic head according to the present embodiment will now be described. In the magnetic head according to the present embodiment, the top surface 15T of the main pole 15 includes the inclined portion 15T1, and the bottom end 15L of the main pole 15 includes the inclined portion 15L1. This allows the thickness of a portion of the main pole 15 near the medium facing surface 80 to decrease toward the medium facing surface 80. Consequently, the present embodiment is able to prevent the occurrence of unwanted erasure induced by a skew. On the other hand, a portion of the main pole 15 located away from the medium facing surface 80 can have a large thickness, so that the main pole 15 can guide much magnetic flux to the medium facing surface 80. This makes it possible to enhance write characteristics, such as overwrite property.

In the present embodiment, the specific coil element 21 has the front end portion 21a and the first inclined surface 21b contiguous with the front end portion 21a. The magnetic layer 42 constituting part of the first return path section 40 is connected to the top surface 16Ad of the top shield layer 16A, and has the second inclined surface 42b opposed to the first inclined surface 21b of the specific coil element 21. The specific coil element 21 includes a portion interposed between the top surface 15T of the main pole 15 and the second inclined surface 42b of the magnetic layer 42. Such a configuration in the present embodiment makes it possible to reduce the distance between the medium facing surface 80 and the end of the first coil 20 closest to the medium facing surface 80, i.e., the front end portion 21a of the specific coil element 21. Consequently, the present embodiment allows for a reduction in length of the magnetic path passing through the write shield 16, the first return path section 40 and the main pole 15.

In the present embodiment, the top shield layer 16A is located on the leading side, i.e., the rear side in the direction T of travel of the recording medium 90, relative to the imaginary plane P1 including the first inclined surface 21b of the specific coil element 21. Consequently, the inclined portion 15T1 of the top surface 15T of the main pole 15 is also located on the leading side, i.e., the rear side in the direction T of travel of the recording medium 90, relative to the imaginary plane P1. This allows the front end portion 21a of the specific coil element 21 to be located closer to the medium facing surface 80 when compared with the case where the first inclined surface 21b of the specific coil element 21 and the inclined portion 15T1 of the top surface 15T of the main pole 15 are located in one plane. The present embodiment thus allows for a further reduction in length of the aforementioned magnetic path.

In the present embodiment, the bottom surface 16Ac of the top shield layer 16A is opposed to the inclined portion 15T1 of the top surface 15T of the main pole 15 with the gap section 17 interposed therebetween. The top shield layer 16A is relatively small in length in the direction D perpendicular to the medium facing surface 80. Consequently, the present embodiment makes it possible to prevent leakage of magnetic flux from the main pole 15 to the top shield layer 16A.

The magnetic layer 42 is connected to the top surface 16Ad of the top shield layer 16A. At a location near the rear end face 16Ab of the top shield layer 16A and farther from the medium facing surface 80 relative to the rear end face 16Ab, the first insulating film 71 is interposed between the top surface 15T of the main pole 15 and the magnetic layer 42. The first insulating film 71 is greater than the top shield layer 16A in thickness in the direction T of travel of the recording medium 90. This makes it possible to prevent leakage of magnetic flux from the main pole 15 to the magnetic layer 42.

As mentioned previously, the length of the magnetic layer 42 in the direction D perpendicular to the medium facing surface 80 is greater than that of the top shield layer 16A, and increases with increasing distance from the top shield layer 16A. This makes it possible to prevent saturation of magnetic flux in the top shield layer 16A and the magnetic layer 42. If saturation of magnetic flux occurs in the top shield layer 16A or the magnetic layer 42, there arises the problem that the magnetic flux leaks from the top shield layer 16A or the magnetic layer 42 toward the medium facing surface 80, and the leakage flux causes accidental erasure of data written on the recording medium 90.

Where the top shield layer 16A is formed of a material having a higher saturation flux density than that of the magnetic material used to form at least part of the first return path section 40, it is possible to prevent saturation of magnetic flux in the top shield layer 16A with higher reliability.

Suppose here that the specific coil element 21 and the magnetic layer 42 are separated from each other by only a thin insulating layer constituting the gap section 17. In such a case, there is a possibility that when a currently is fed to the first coil 20, a puncture may occur in the thin insulating layer to cause shorting of the first coil 20 and the magnetic layer 42. To avoid this, in the present embodiment the specific coil element 21 and the magnetic layer 42 are separated from each other by the insulating section 70 including the first and second insulating films 71 and 72. The thickness of each of the first and second insulating films 71 and 72 can be selected independently of the thickness of the second gap layer 19 constituting the gap section 17. Thus, the first and second insulating films 71 and 72 can have a larger thickness than the second gap layer 19. The thinnest portion of each of the first and second insulating films 71 and 72 is 0.1- to 0.15 μm thick, for example. The present embodiment thus allows for enhancement of the insulation strength of the insulating section 70 while allowing the distance between the end face 15a of the main pole 15 and the front end face 16Aa (the first end face portion 16Aa) of the top shield layer 16A in the medium facing surface 80 to be of a desired value determined by the thickness of the second gap layer 19. Consequently, the present embodiment makes it possible to prevent shorting of the first coil 20 and the magnetic layer 42.

A method of manufacturing the magnetic head according to the present embodiment will now be described. As shown in FIGS. 2 and 3, the method of manufacturing the magnetic head according to the present embodiment first forms the insulating layer 2, the first read shield layer 3 and the first read shield gap film 4 in this order on the substrate 1. Then, the MR element 5 and leads (not illustrated) connected to the MR element 5 are formed on the first read shield gap film 4. The MR element 5 and the leads are then covered with the second read shield gap film 6. Next, the second read shield layer 7, the nonmagnetic layer 76, the middle shield layer 77 and the nonmagnetic layer 78 are formed in this order on the second read shield gap film 6.

Next, the magnetic layer 31 is formed on the nonmagnetic layer 78 by frame plating, for example. Then, the first insulating layer (not illustrated) is formed over the entire top surface of the stack. The first insulating layer is then polished by, for example, chemical mechanical polishing (hereinafter referred to as CMP), until the magnetic layer 31 is exposed. The magnetic layers 32 and 33 are then formed on the magnetic layer 31 by frame plating, for example. The insulating film 51 is then formed over the entire top surface of the stack. The second coil 10 is then formed by frame plating, for example. The insulating layer 52 is then formed in the space between adjacent turns of the second coil 10. Next, the second insulating layer (not illustrated) is formed over the entire top surface of the stack. The insulating film 51 and the second insulating layer are then polished by, for example, CMP, until the second coil 10, the magnetic layers 32 and 33 and the insulating layer 52 are exposed.

Then, the insulating layer 53 is formed over the entire top surface of the stack. The insulating layer 53 is then selectively etched to form therein a first opening for exposing the top surface of the magnetic layer 32, a second opening for exposing the top surface of the magnetic layer 33, and a third opening for exposing the coil connection 10E (see FIG. 4) of the second coil 10. Then, an initial bottom shield layer, which will later become the bottom shield layer 16B, is formed on the magnetic layer 32 at the location of the first opening, the magnetic layer 34 is formed on the magnetic layer 33 at the location of the second opening, and the first connection layer (not illustrated) is formed on the coil connection 10E at the location of the third opening, by frame plating, for example. Next, the nonmagnetic layer 54 is formed over the entire top surface of the stack. The nonmagnetic layer 54 is then polished by, for example, CMP, until the initial bottom shield layer, the magnetic layer 34 and the first connection layer are exposed.

Next, the initial bottom shield layer and the nonmagnetic layer 54 are taper-etched in part by, for example, ion beam etching (hereinafter referred to as IBE) so that the top surface of the initial bottom shield layer is provided with a portion to be opposed to the inclined portion 15L1 (see FIG. 1) of the bottom end 15L of the main pole 15 to be formed later. This makes the initial bottom shield layer into the bottom shield layer 16B. This etching process also etches the magnetic layer 34 and the first connection layer in part.

Next, the side shield layers 16C and 16D are formed on the bottom shield layer 16B by frame plating, for example. The first gap layer 18 is then formed to cover the bottom shield layer 16B and the side shield layers 16C and 16D. Where alumina is selected as the material of the first gap layer 18, the first gap layer 18 is formed by atomic layer deposition, for example. Where Ru is selected as the material of the first gap layer 18, the first gap layer 18 is formed by chemical vapor deposition, for example. Next, the first gap layer 18 is selectively etched to form therein an opening for exposing the top surface of the magnetic layer 34 and an opening for exposing the top surface of the first connection layer.

Reference is now made to FIG. 6 to FIG. 13 to describe a series of steps to be performed after the foregoing step up to the formation of the nonmagnetic layer 74. FIGS. 6 to 13 each illustrate a stack of layers formed in the process of manufacturing the magnetic head. FIGS. 6 to 13 show a cross section perpendicular to the medium facing surface 80 and to the top surface 1a of the substrate 1, particularly the main cross section. FIGS. 6 to 13 omit the illustration of portions located below the bottom shield layer 16B and the insulating layer 53.

In the step shown in FIG. 6, a magnetic layer that will later become the main pole 15, and the second connection layer (not illustrated) are first formed by frame plating, for example. The magnetic layer and the second connection layer are formed such that their top surfaces are higher in level than portions of the first gap layer 18 lying on the side shield layers 16C and 16D. Next, the first nonmagnetic layer (not illustrated) is formed over the entire top surface of the stack. The magnetic layer, the second connection layer, the first gap layer 18 and the first nonmagnetic layer are then polished by, for example, CMP, until the side shield layers 16C and 16D are exposed.

Next, an initial nonmagnetic section is formed on the aforementioned magnetic layer. The initial nonmagnetic section includes a first mask layer and a second mask layer that will later become the first nonmagnetic layer 61 and the second nonmagnetic layer 62, respectively. The first and second mask layers are formed by sputtering, for example. The aforementioned magnetic layer, the side shield layers 16C and 16D, the first mask layer, the second mask layer and the first nonmagnetic layer are then etched in part by IBE, for example. This etching makes the magnetic layer into the main pole 15. This etching also makes the first mask layer and the second mask layer into the first nonmagnetic layer 61 and the second nonmagnetic layer 62, respectively, thereby making the initial nonmagnetic section into the nonmagnetic section 60.

Where IBE is employed to etch the aforementioned magnetic layer, the side shield layers 16C and 16D, the first mask layer, the second mask layer and the first nonmagnetic layer in part, the ion beams are allowed to travel in a direction at an angle of 40° to 75° with respect to the direction perpendicular to the top surface 1a (see FIGS. 2 and 3) of the substrate 1, and the direction of travel of the ion beams is caused to rotate as viewed in the direction perpendicular to the top surface 1a of the substrate 1. Performing IBE in such a manner provides the aforementioned magnetic layer with the inclined portion 15T1 and the flat portion 15T2, and at the same time provides the initial nonmagnetic section with the front end face 60b of the nonmagnetic section 60 contiguous with the inclined portion 15T1.

Figure 6:
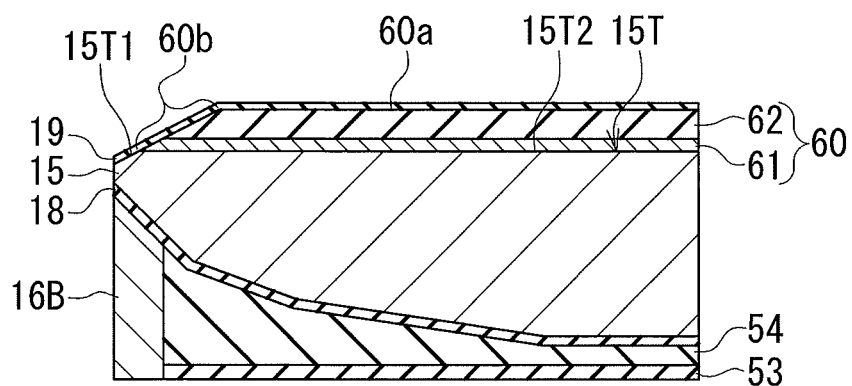
FIG. 6 is a cross-sectional view showing a step of a method of manufacturing the magnetic head according to the first embodiment of the invention.

In the step shown in FIG. 6, the second gap layer 19 is then formed over the entire top surface of the stack by sputtering or chemical vapor deposition, for example.

Figure 7:
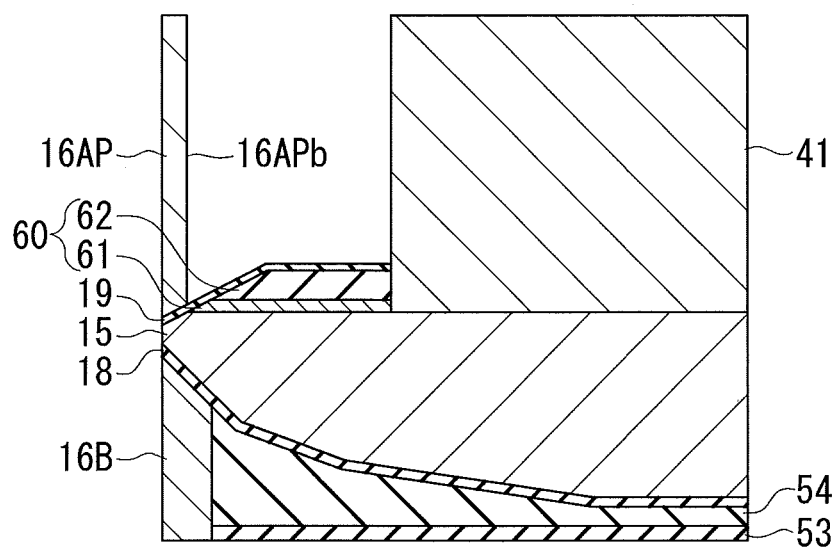
FIG. 7 is a cross-sectional view showing a step that follows the step shown in FIG. 6.

FIG. 7 shows the next step. In this step, first, the second gap layer 19 and the first and second nonmagnetic layers 61 and 62 are selectively etched so that the second portion of the top surface 15T of the main pole 15 and portions of the top surfaces of the side shield layers 16C and 16D are exposed, and the second gap layer 19 is selectively etched so that the top surface of the second connection layer is exposed. The aforementioned etching is performed by IBE, for example. Next, an initial top shield layer 16AP is formed on the side shield layers 16C and 16D (see FIG. 3) and the second gap layer 19, and the magnetic layer 41 is formed on the main pole 15, by frame plating, for example. The initial top shield layer 16AP undergoes etching later to become the top shield layer 16A. The initial top shield layer 16AP has an initial rear end face 16APb. The initial rear end face 16APb of the initial top shield layer 16AP is smaller than the rear end face 16Ab of the top shield layer 16A shown in FIG. 1 in length in the direction T of travel of the recording medium 90 (the upward direction in FIG. 7).

Figure 8:
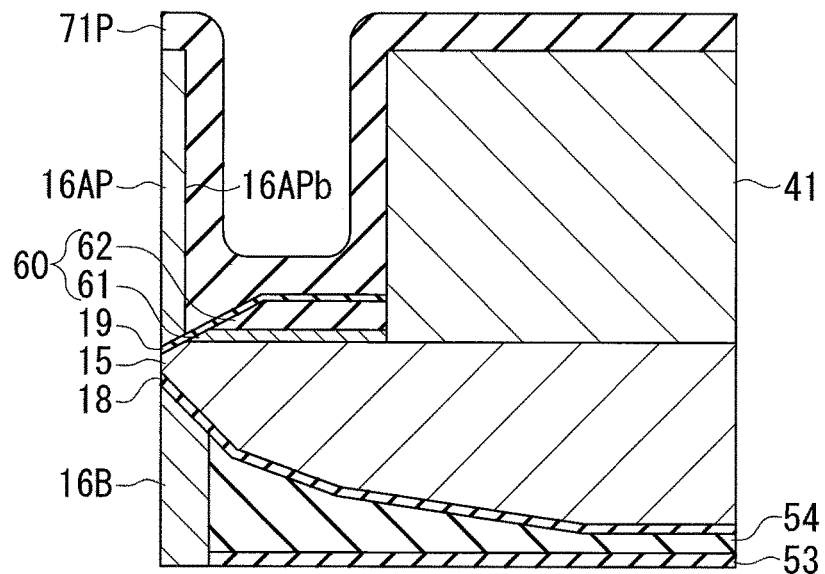
FIG. 8 is a cross-sectional view showing a step that follows the step shown in FIG. 7.

FIG. 8 shows the next step. In this step, first, an initial first insulating film 71P is formed over the entire top surface of the stack by atomic layer deposition, for example. The initial first insulating film 71P will later become the first insulating film 71. The thinnest portion of the initial first insulating film 71P is 0.1- to 0.15-μm thick, for example. The initial first insulating film 71P is formed to be in contact with the initial rear end face 16APb of the initial top shield layer 16AP. Then, the initial first insulating film 71P is selectively etched to form therein an opening for exposing the top surface of the second connection layer.

Figure 9:
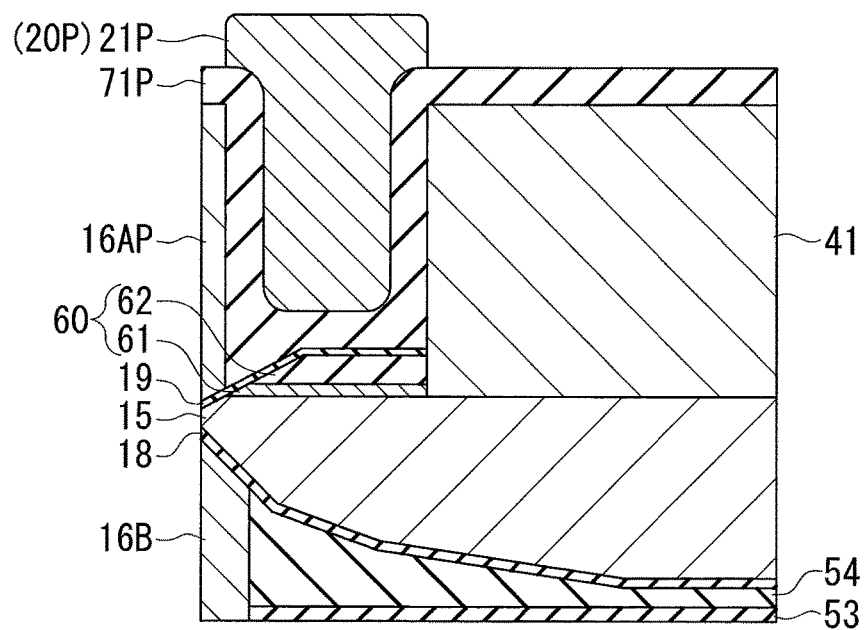
FIG. 9 is a cross-sectional view showing a step that follows the step shown in FIG. 8.

FIG. 9 shows the next step. In this step, an initial coil 20P is formed by frame plating, for example. The initial coil 20P will later become the first coil 20. The initial coil 20P is formed such that a portion thereof rides over the initial top shield layer 16AP and the magnetic layer 41. The initial coil 20P includes an initial coil element 21P located on the initial first insulating film 71P. The initial coil element 21P will later become the specific coil element 21.

Figure 10:
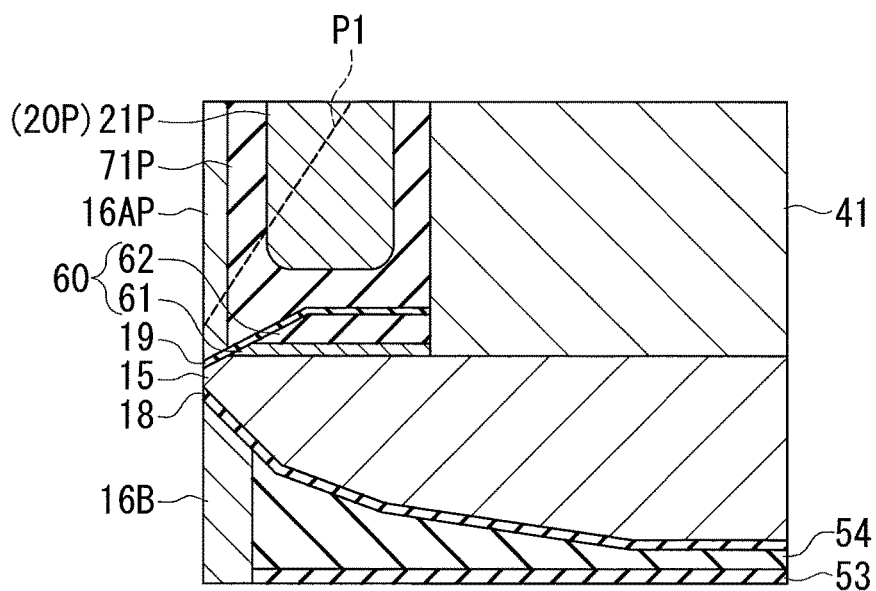
FIG. 10 is a cross-sectional view showing a step that follows the step shown in FIG. 9.

FIG. 10 shows the next step. In this step, first, the second nonmagnetic layer (not illustrated) is formed over the entire top surface of the stack. The initial top shield layer 16AP, the initial coil 20P, the magnetic layer 41, the initial first insulating film 71P and the second nonmagnetic layer are then polished by, for example, CMP, until the level of the top surface of the specific coil element 21 to be formed later is reached. FIG. 10 also shows the imaginary plane P1. The imaginary plane P1 indicates the location of the first inclined surface 21b of the specific coil element 21 to be formed later.

Figure 11:
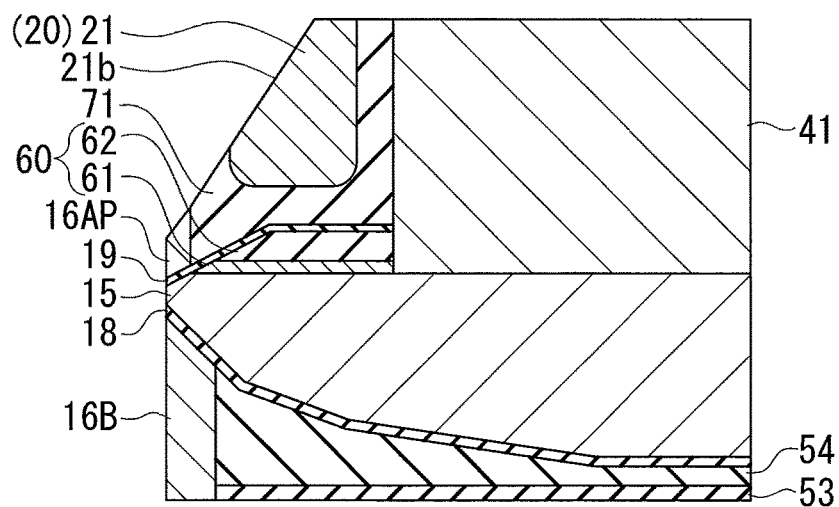
FIG. 11 is a cross-sectional view showing a step that follows the step shown in FIG. 10.

FIG. 11 shows the next step. In this step, first, a first photoresist mask (not illustrated) is formed to cover a portion of the initial coil 20P. The first photoresist mask is formed by patterning a photoresist layer. The first photoresist mask does not cover a portion of the initial coil 20P where the first inclined surface 21b of the specific coil element 21 is to be formed. The initial top shield layer 16AP, the initial coil element 21P, the initial first insulating film 71P and the second nonmagnetic layer are then etched in part by, for example, IBE, using the first photoresist mask as an etching mask. This etching provides the initial coil element 21P with the first inclined surface 21b of the specific coil element 21. This makes the initial coil element 21P into the specific coil element 21, thereby making the initial coil 20P into the first coil 20. This etching also makes the initial first insulating film 71P into the first insulating film 71. In this step, the first inclined surface 21b is formed in the initial coil element 21P such that, as shown in FIG. 1, the third end E3 of the first inclined surface 21b is located on the front side in the direction T of travel of the recording medium 90 relative to the bottom surface 21c of the specific coil element 21. The first photoresist mask is then removed.

Where IBE is employed to etch the initial top shield layer 16AP, the initial coil element 21P, the initial first insulating film 71P and the second nonmagnetic layer in part, the ion beams are allowed to travel in a direction at an angle with respect to the direction perpendicular to the top surface 1a (see FIGS. 2 and 3) of the substrate 1.

Figure 12:
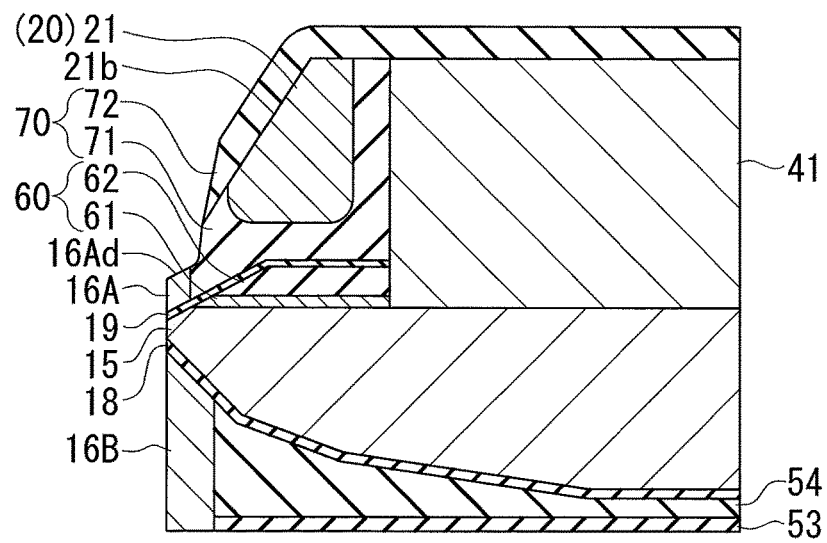
FIG. 12 is a cross-sectional view showing a step that follows the step shown in FIG. 11.

FIG. 12 shows the next step. In this step, first, the second insulating film 72 is formed over the entire top surface of the stack by atomic layer deposition, for example. The thinnest portion of the second insulating film 72 is 0.1- to 0.15-μm thick, for example. The second insulating film 72 is formed to cover the first inclined surface 21b of the specific coil element 21. Then, a second photoresist mask (not illustrated) is formed on the top surface of the stack. The second photoresist mask is formed by the same method as that used for forming the first photoresist mask. The second photoresist mask does not cover a portion of the top surface of the stack near the location at which the medium facing surface 80 is to be formed. The initial top shield layer 16AP, the first insulating film 71 and the second insulating film 72 are then etched in part by, for example, IBE, using the second photoresist mask as an etching mask. This etching provides the initial top shield layer 16AP with the top surface 16Ad of the top shield layer 16A, thereby making the initial top shield layer 16AP into the top shield layer 16A. The second photoresist mask is then removed.

Figure 13:
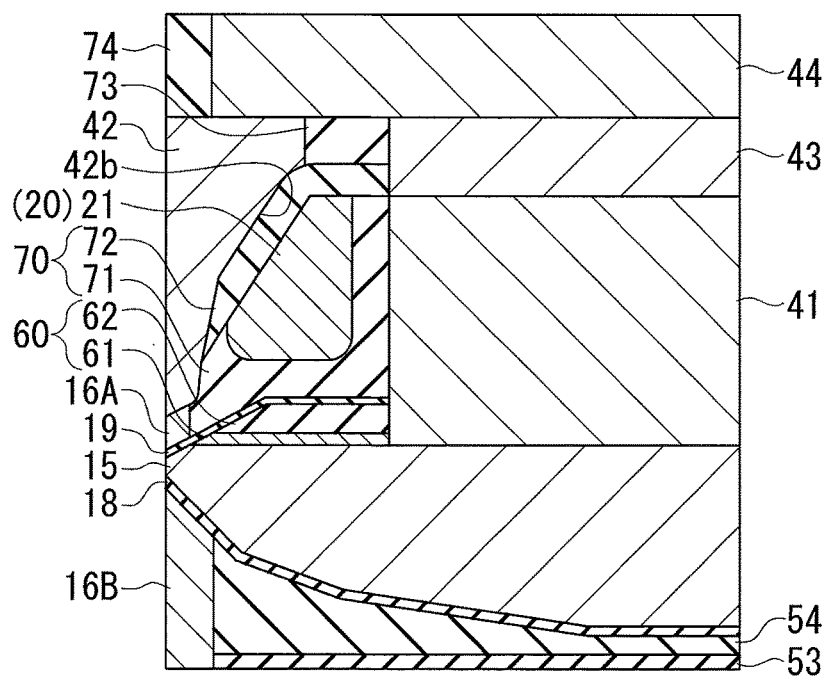
FIG. 13 is a cross-sectional view showing a step that follows the step shown in FIG. 12.

FIG. 13 shows the next step. In this step, first, the second insulating film 72 is selectively etched to form therein an opening for exposing the top surface of the magnetic layer 41. Then, the magnetic layer 42 is formed on the top shield layer 16A, the first insulating film 71 and the second insulating film 72, and the magnetic layer 43 is formed on the magnetic layer 41, by frame plating, for example. Next, the nonmagnetic layer 73 is formed over the entire top surface of the stack. The nonmagnetic layer 73 is then polished by, for example, CMP, until the magnetic layers 42 and 43 are exposed. Next, the magnetic layer 44 is formed on the magnetic layers 42 and 43 and the nonmagnetic layer 73 by frame plating, for example. Then, the nonmagnetic layer 74 is formed over the entire top surface of the stack. The nonmagnetic layer 74 is then polished by, for example, CMP, until the magnetic layer 44 is exposed.

Steps that follow the step shown in FIG. 13 will now be described with reference to FIGS. 2 and 3. First, the protective layer 75 is formed to cover the entire top surface of the stack. Then, wiring, terminals and other components are formed on the protective layer 75, and the substrate 1 is cut near the location at which the medium facing surface 80 is to be formed. The cut surface is then polished to form the medium facing surface 80, and processing such as fabrication of flying rails is performed to complete the magnetic head.

As shown in FIG. 6, the method of manufacturing the magnetic head according to the present embodiment described above includes the steps of: forming a magnetic layer that will become the main pole 15; etching the magnetic layer so as to provide the magnetic layer with the inclined portion 15T1 and the flat portion 15T2 and thereby make the magnetic layer into the main pole 15; and forming the gap section 17 constituted by a portion of the first gap layer 18 and a portion of the second gap layer 19. As shown in FIG. 6, the method of manufacturing the magnetic head according to the present embodiment further includes the steps of: forming the initial nonmagnetic section on the magnetic layer that will become the main pole 15; and etching the initial nonmagnetic section so as to provide the initial nonmagnetic section with the front end face 60b of the nonmagnetic section 60 and thereby make the initial nonmagnetic section into the nonmagnetic section 60.

As shown in FIGS. 7 to 9, the method of manufacturing the magnetic head according to the present embodiment further includes the steps of: forming the initial top shield layer 16AP after the main pole 15 and the gap section 17 are formed, the initial top shield layer 16AP undergoing etching later to become the top shield layer 16A; forming the initial first insulating film 71P after the initial top shield layer 16AP is formed; and forming the initial coil 20P including the initial coil element 21P located on the initial first insulating film 71P. As shown in FIGS. 11 and 12, the method of manufacturing the magnetic head according to the present embodiment further includes the steps of: etching the initial coil element 21P and the initial first insulating film 71P so as to make the initial coil element 21P into the specific coil element 21 and make the initial first insulating film 71P into the first insulating film 71; and forming the second insulating film 72.

The method of manufacturing the magnetic head according to the present embodiment further includes the step of forming the first return path section 40. As shown in FIG. 13, the step of forming the first return path section 40 forms the magnetic layer 42 after the second insulating film 72 is formed. The magnetic layer 42 includes the second inclined surface 42b and constitutes part of the first return path section 40. In the present embodiment, the magnetic layer 41 constituting part of the first return path section 40 is formed before the formation of the initial coil 20P, and the magnetic layers 42 to 44 constituting the remainder of the first return path section 40 are formed after the formation of the second insulating film 72. Alternatively, the whole of the first return path section 40 may be formed after the formation of the second insulating film 72.

In the method of manufacturing the magnetic head according to the present embodiment, the inclined portion 15T1 of the top surface 15T of the main pole 15 is formed before the first inclined surface 21b of the specific coil element 21 is formed. The inclined portion 15T1 is located on the leading side, i.e., the rear side in the direction T of travel of the recording medium 90, relative to the imaginary plane P1 including the first inclined surface 21b. Consequently, the step of forming the first inclined surface 21b does not change either the inclination angle or the location of the inclined portion 15T1. In other words, the step of forming the first inclined surface 21b does not change either the shape of the end face 15a of the main pole 15 or the shape of a portion of the main pole 15 near the medium facing surface 80. Consequently, the present embodiment makes it possible to suppress variations in write characteristics.

In the method of manufacturing the magnetic head according to the present embodiment, the initial coil 20P including the initial coil element 21P is formed after the initial top shield layer 16AP and the initial first insulating film 71P are formed. Thereafter, the initial coil element 21P is etched so that the first inclined surface 21b is formed, and at the same time, the initial top shield layer 16AP and the initial first insulating film 71P are etched into the top shield layer 16A and the first insulating film 71, respectively. The first inclined surface 21b is formed such that the third end E3 of the first inclined surface 21b is located on the front side in the direction T of travel of the recording medium 90 relative to the bottom surface 21c of the specific coil element 21. In the present embodiment, the location of the front end portion 21a of the specific coil element 21 is defined by the top shield layer 16A and the first insulating film 71, and is not changed by the step of forming the first inclined surface 21b. Thus, the step of forming the first inclined surface 21b does not change the location of the end of the first coil 20 closest to the medium facing surface 80, that is, the location of the front end portion 21a of the specific coil element 21. This feature of the present embodiment also contributes to suppression of variations in write characteristics.

As has been described, the present embodiment makes it possible to prevent the occurrence of unwanted erasure induced by a skew, shorten the length of the magnetic path through the write shield 16, the first return path section 40 and the main pole 15, and suppress variations in write characteristics.

Second Embodiment

Figure 14:
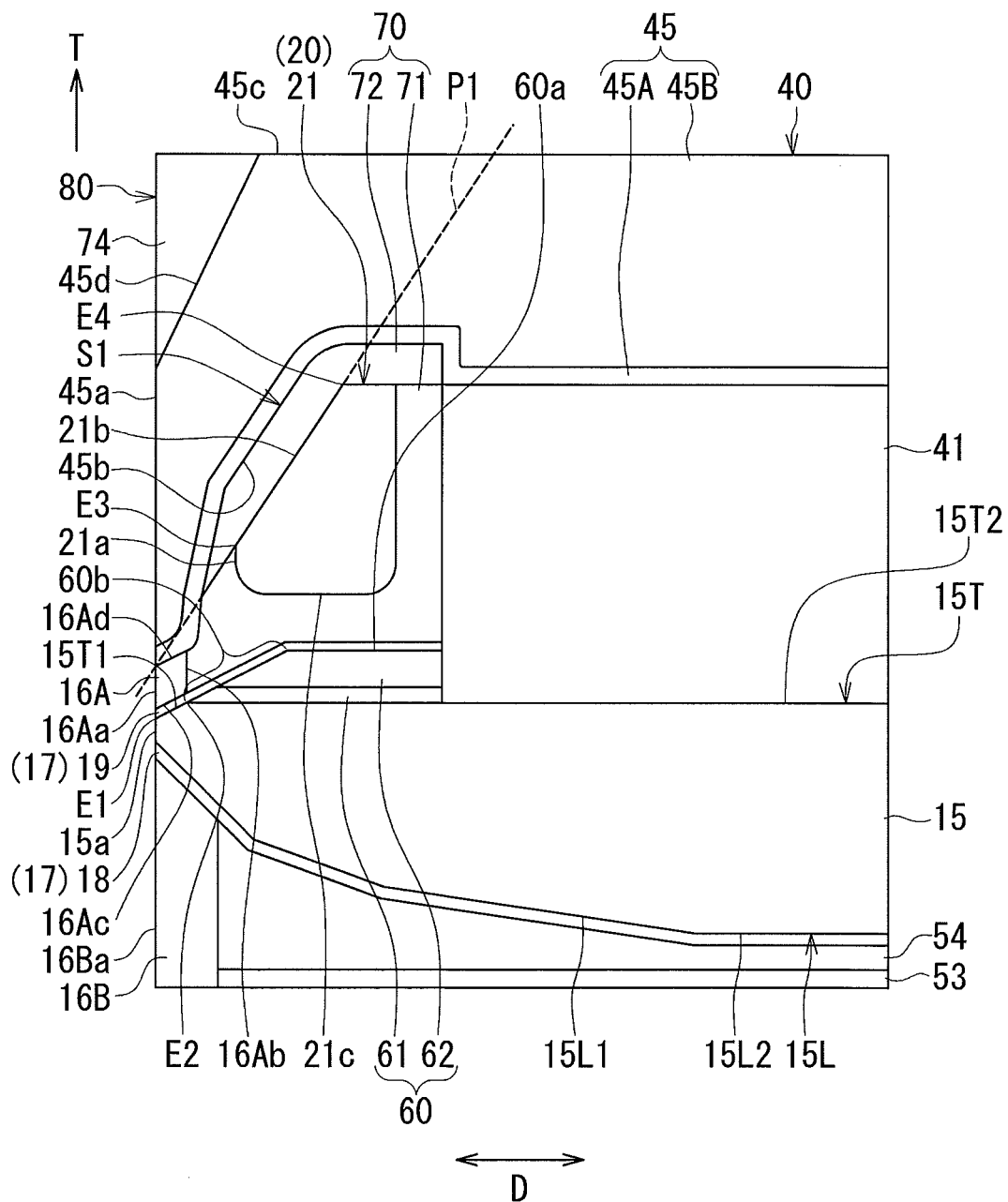
FIG. 14 is a cross-sectional view showing the main part of a magnetic head according to a second embodiment of the invention.

A magnetic head according to a second embodiment of the present invention will now be described with reference to FIG. 14. FIG. 14 is a cross-sectional view showing the main part of the magnetic head according to the present embodiment. FIG. 14 shows a cross section perpendicular to the medium facing surface and to the top surface of the substrate, particularly the main cross section. The arrow labeled T in FIG. 14 indicates the direction of travel of the recording medium.

The magnetic head according to the present embodiment differs from the magnetic head according to the first embodiment in the following ways. The magnetic head according to the present embodiment includes a magnetic layer 45 in place of the magnetic layers 42, 43 and 44 of the first embodiment. The magnetic layer 45 is formed of a magnetic material and constitutes part of the first return path section 40. The nonmagnetic layer 73 is not provided in the present embodiment.

The magnetic layer 45 lies on the top shield layer 16A, the magnetic layer 41, the first insulating film 71 and the second insulating film 72, and connects the top shield layer 16A and the magnetic layer 41 to each other. The magnetic layer 45 is connected to the top surface 16Ad of the top shield layer 16A, and has an end face 45a located in the medium facing surface 80 and a second inclined surface 45b opposed to the first inclined surface 21b of the specific coil element 21. Since the magnetic layer 45 constitutes part of the first return path section 40, the first return path section 40 can be said to be connected to the top surface 16Ad of the top shield layer 16A and have the second inclined surface 45b. The second inclined surface 45b is inclined with respect to the medium facing surface 80 and the direction D perpendicular to the medium facing surface 80 in such a manner as to become parallel or almost parallel to the first inclined surface 21b of the specific coil element 21. In the present embodiment, the second insulating film 72 extends to pass through between the first inclined surface 21b and the second inclined surface 45b.

The magnetic layer 45 further has a top surface 45c, and a connecting surface 45d connecting the end face 45a and the top surface 45c to each other. The distance from the medium facing surface 80 to an arbitrary point on the connecting surface 45d increases with increasing distance from the arbitrary point to the top surface 1a (see FIGS. 2 and 3) of the substrate 1. In the present embodiment, the nonmagnetic layer 74 is disposed around the magnetic layer 45. A portion of the nonmagnetic layer 74 is interposed between the connecting surface 45d of the magnetic layer 45 and the medium facing surface 80.

The magnetic layer 45 includes an electrode film 45A and a magnetic layer body 45B lying on the electrode film 45A. The electrode film 45A is used as an electrode and a seed when forming the magnetic layer body 45B by plating.

The magnetic layer 41 and the electrode film 45A may be formed of a magnetic material the same as that used to form the magnetic layer body 45B. However, it is preferred that the magnetic layer 41 and the electrode film 45A be formed of a magnetic material having a saturation flux density higher than that of the magnetic material used to form the magnetic layer body 45B. Forming the magnetic layer 41 and the electrode film 45A of a magnetic material having a saturation flux density higher than that of the magnetic material used to form the magnetic layer body 45B allows the first return path section 40 to have a first layer and a second layer formed of magnetic materials different from each other. The first layer is constituted by the magnetic layer 41 and the electrode film 45A. The second layer is constituted by the magnetic layer body 45B. The first layer (the magnetic layer 41 and the electrode film 45A) connects the top shield layer 16A and the main pole 15 to each other. The second layer (the magnetic layer body 45B) is stacked on the first layer. The magnetic material used to form the first layer (the magnetic layer 41 and the electrode film 45A) has a saturation flux density higher than that of the magnetic material used to form the second layer (the magnetic layer body 45B). For example, the magnetic material used to form the first layer may be CoNiFe or CoFe having a saturation flux density of approximately 2.4 T, and the magnetic material used to form the second layer may be FeNi having a saturation flux density of approximately 1.9 T.

The first layer is located closer to the first coil element 21 than is the second layer. Consequently, a magnetic path formed inside the first return path section 40 and passing through only the first layer is shorter than a magnetic path formed inside the first return path section 40 and passing through the first and second layers. Given this situation, forming the first layer of a magnetic material higher in saturation flux density than the magnetic material used to form the second layer as described above makes it possible for a larger amount of magnetic flux to pass through the aforementioned shorter magnetic path passing through only the first layer. This means a reduction in the effective length of the magnetic path passing through the write shield 16, the first return path section 40 and the main pole 15. Consequently, it becomes possible to improve the high frequency characteristics of the write head unit 9.

If the first return path section 40 is formed entirely of a high saturation flux density material, magnetic flux may leak from the end face 45a of the magnetic layer 45 toward the recording medium 90 to induce unwanted erasure. Using a high saturation flux density material to form only the first layer and not the second layer makes it possible to improve the high frequency characteristics of the write head unit 9 while preventing the occurrence of unwanted erasure.

A method of manufacturing the magnetic head according to the present embodiment will now be described with reference to FIG. 14. The method of manufacturing the magnetic head according to the present embodiment is the same as the method according to the first embodiment up to the step shown in FIG. 12. The next step in the present embodiment is to form the electrode film 45A over the entire top surface of the stack. Then, the magnetic layer body 45B is formed by plating, using the electrode film 45A as an electrode and a seed. The electrode film 45A except a portion thereof lying under the magnetic layer body 45B is then removed by, for example, IBE, using the magnetic layer body 45B as an etching mask. Then, a portion of the magnetic layer body 45B near the location at which the medium facing surface 80 is to be formed is taper-etched by IBE, for example. This provides the magnetic layer body 45B with the connecting surface 45d of the magnetic layer 45. Next, the nonmagnetic layer 74 is formed over the entire top surface of the stack. The nonmagnetic layer 74 is then polished by, for example, CMP, until the magnetic layer 45 is exposed. The subsequent steps are the same as those in the first embodiment.

The remainder of configuration, function and effects of the present embodiment are similar to those of the first embodiment.

Third Embodiment

Figure 15:
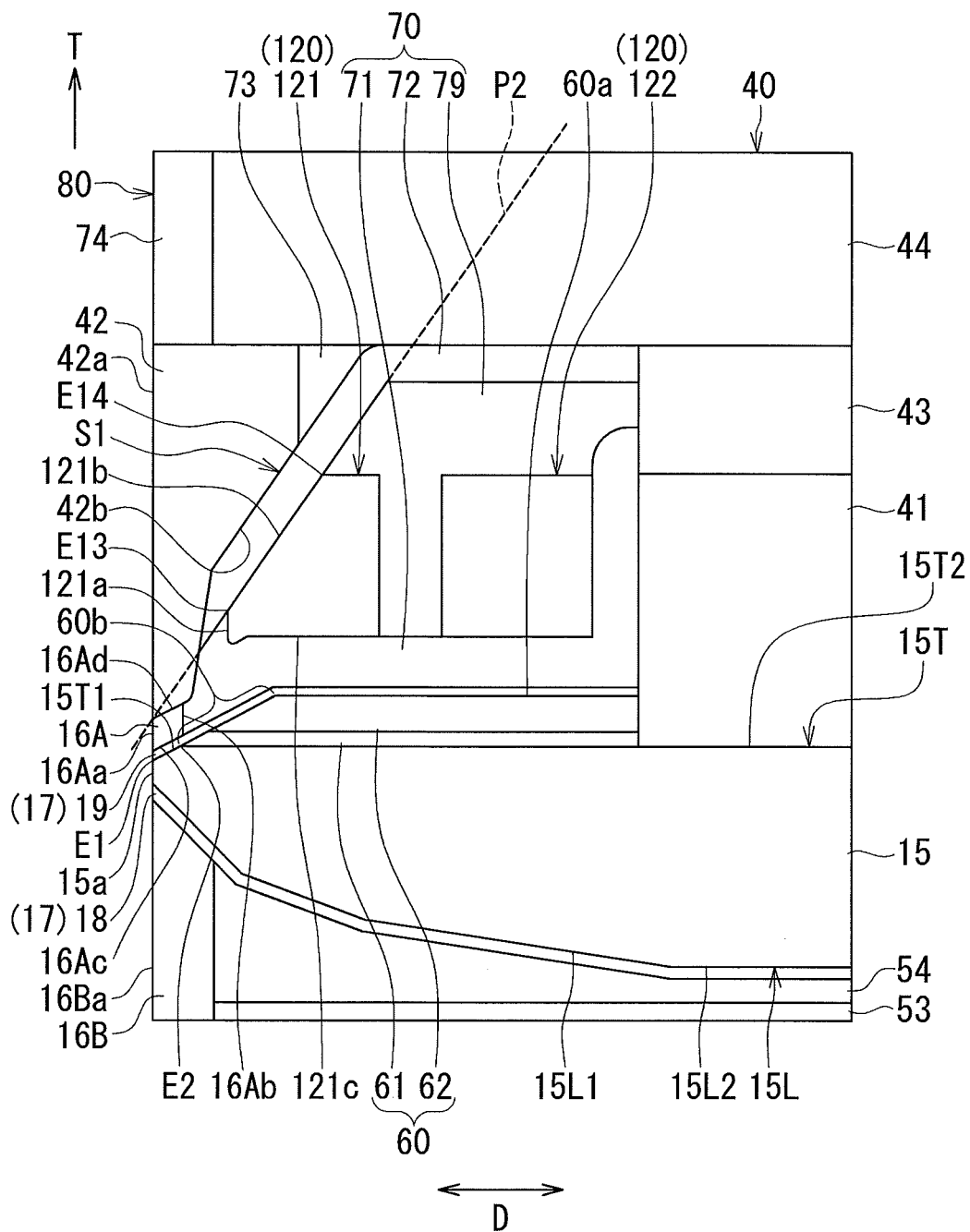
FIG. 15 is a cross-sectional view showing the main part of a magnetic head according to a third embodiment of the invention.
Figure 16:
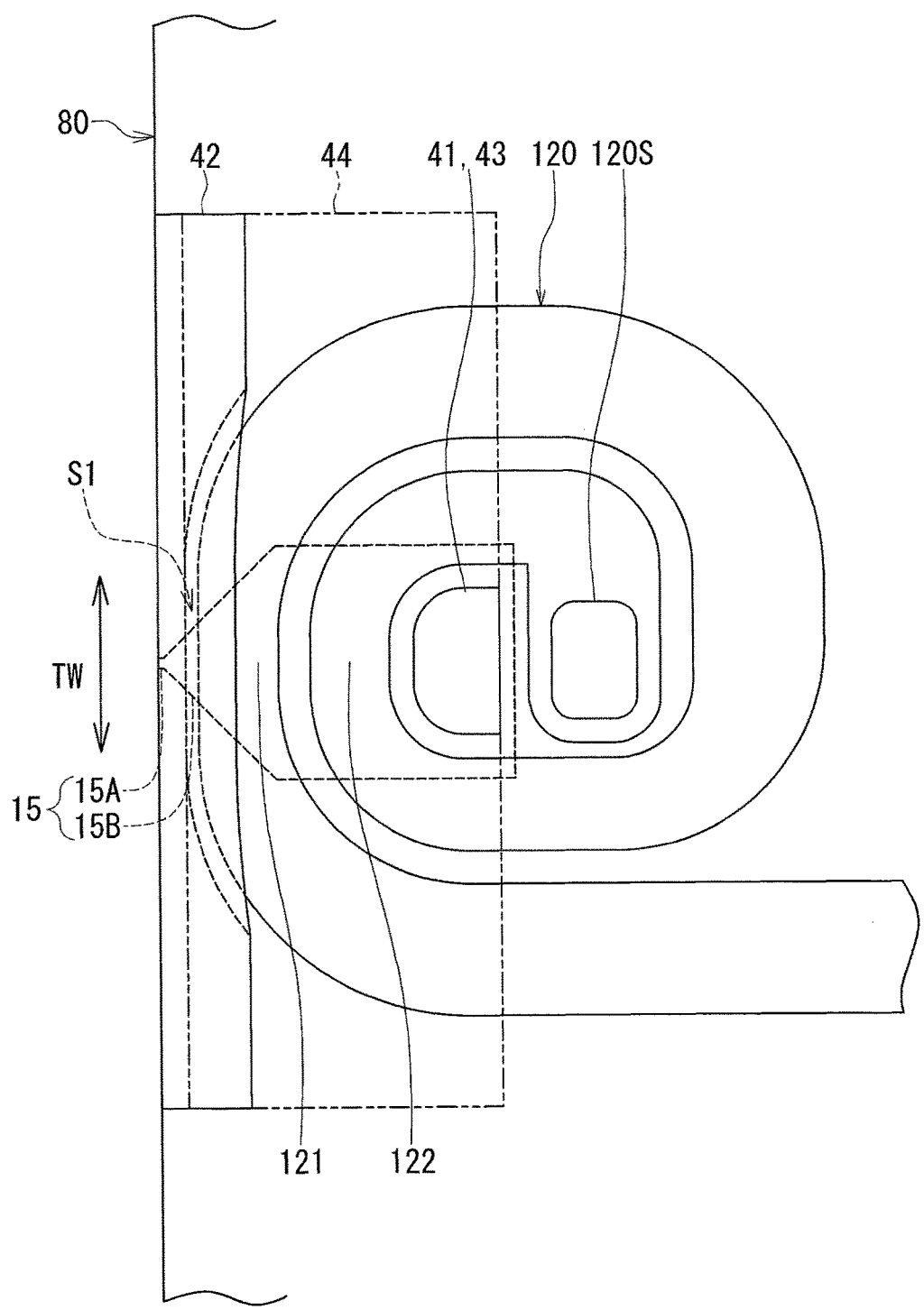
FIG. 16 is a plan view showing the first coil of the magnetic head according to the third embodiment of the invention.

A magnetic head according to a third embodiment of the invention will now be described with reference to FIGS. 15 and 16. FIG. 15 is a cross-sectional view showing the main part of the magnetic head according to the present embodiment. FIG. 15 shows a cross section perpendicular to the medium facing surface and to the top surface of the substrate, particularly the main cross section. The arrow labeled T in FIG. 15 indicates the direction of travel of the recording medium. FIG. 16 is a plan view showing a first coil of the magnetic head according to the present embodiment. The arrow labeled TW in FIG. 16 indicates the track width direction.

The magnetic head according to the present embodiment differs from the magnetic head according to the first embodiment in the following ways. The magnetic head according to the present embodiment includes a first coil 120 in place of the first coil 20 of the first embodiment. As shown in FIG. 16, the first coil 120 is wound approximately twice around the magnetic layer 41. The magnetic head further includes an insulating layer 79 formed of an insulating material and disposed on the top surface of the first coil 120 and in the space between adjacent turns of the first coil 120. The insulating layer 79 is formed of alumina, for example. In the present embodiment, the second insulating film 72 is disposed to cover the first insulating film 71, the insulating layer 79 and at least part of the first coil 120.

As shown in FIG. 16, the first coil 120 includes two first coil elements 121 and 122 extending to pass through the first space S1, particularly through between the magnetic layer 42 and the magnetic layer 41. The first coil elements 121 and 122 are adjacent to each other in the direction D perpendicular to the medium facing surface 80, the coil element 121 being located closer to the medium facing surface 80 than the coil element 122. The first coil 120 has a coil connection 120S electrically connected to the coil connection 10E (see FIG. 4) of the second coil 10. The coil connection 120S is electrically connected to the coil connection 10E via the first and second connection layers described in the first embodiment section. The coil connection 120S lies on the second connection layer. The first coil 120 and the second coil 10 are connected in series.

In the present embodiment, the first coil element 121 is the specific coil element. The specific coil element 121 is of the same shape as the specific coil element 21 of the first embodiment. More specifically, as shown in FIG. 15, the specific coil element 121 includes: a front end portion 121a located closest to the medium facing surface 80; a first inclined surface 121b located on the trailing side, i.e., the front side in the direction T of travel of the recording medium 90 (see FIG. 2) relative to the front end portion 121a and contiguous with the front end portion 121a; and a bottom surface 121c facing the flat portion 15T2 of the top surface 15T of the main pole 15. The front end portion 121a is located at a distance of, for example, 0.15 to 0.25 µm from the medium facing surface 80.

The first inclined surface 121b has a third end E13 closest to the medium facing surface 80 and a fourth end E14 opposite to the third end E13. The first inclined surface 121b is inclined with respect to the medium facing surface 80 and the direction D perpendicular to the medium facing surface 80 such that the fourth end E14 is located at a greater distance from the medium facing surface 80 than is the third end E13. The third end E13 is located on the front side in the direction T of travel of the recording medium 90 relative to the bottom surface 121c of the specific coil element 121.

The top shield layer 16A is located on the front side in the direction T of travel of the recording medium 90 relative to the main pole 15, and is located closer to the medium facing surface 80 than is the specific coil element 121. As shown in FIG. 15, let us assume an imaginary plane P2 including the first inclined surface 121b of the specific coil element 121. The top shield layer 16A is located on the leading side, i.e., the rear side in the direction T of travel of the recording medium 90, relative to the imaginary plane P2.

The second inclined surface 42b of the magnetic layer 42 is opposed to the first inclined surface 121b of the specific coil element 121. The second inclined surface 42b is inclined with respect to the medium facing surface 80 and the direction D perpendicular to the medium facing surface 80 in such a manner as to become parallel or almost parallel to the first inclined surface 121b of the specific coil element 121.

In the present embodiment, the insulating section 70 surrounds the first coil elements 121 and 122. The insulating section 70 includes the insulating layer 79 in addition to the first and second insulating films 71 and 72. The first insulating film 71 and the second insulating film 72 are in contact with each other in the imaginary plane P2. The first insulating film 71 is located on the leading side, i.e., the rear side in the direction T of travel of the recording medium 90 relative to the imaginary plane P2, and extends to be in contact with the rear end face 16Ab of the top shield layer 16A and the front end portion 121a and bottom surface 121c of the specific coil element 121. The first insulating film 71 further extends to pass through between the first coil element 122 and the second gap layer 19 and between the first coil element 122 and the magnetic layer 41. The second insulating film 72 extends to pass through between the first inclined surface 121b and the second inclined surface 42b. The insulating layer 79 is in contact with a portion of the outer surface of the specific coil element 121 other than the front end portion 121a, the first inclined surface 121b and the bottom surface 121c.

A method of manufacturing the magnetic head according to the present embodiment will now be described with reference to FIGS. 17 to 21. FIGS. 17 to 21 each illustrate a stack of layers formed in the process of manufacturing the magnetic head. FIGS. 17 to 21 show a cross section perpendicular to the medium facing surface 80 and to the top surface 1a (see FIGS. 2 and 3) of the substrate 1, particularly the main cross section. FIGS. 17 to 21 omit the illustration of portions located below the bottom shield layer 16B and the insulating layer 53.

Figure 17:
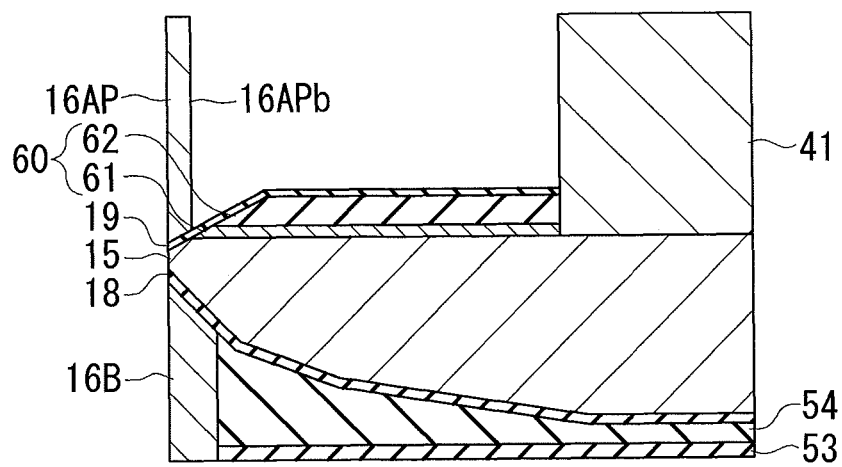
FIG. 17 is a cross-sectional view showing a step of a method of manufacturing the magnetic head according to the third embodiment of the invention.

The method of manufacturing the magnetic head according to the present embodiment is the same as the method according to the first embodiment up to the step shown in FIG. 6. FIG. 17 shows the next step. In this step, first, the second gap layer 19 and the first and second nonmagnetic layers 61 and 62 are selectively etched so that the second portion of the top surface 15T of the main pole 15 and portions of the top surfaces of the side shield layers 16C and 16D are exposed, and the second gap layer 19 is selectively etched so that the top surface of the second connection layer is exposed. The aforementioned etching is performed by IBE, for example. In the present embodiment, when compared with the first embodiment, the second portion of the top surface 15T of the main pole 15 is located at a greater distance from the location at which the medium facing surface 80 is formed. Next, the initial top shield layer 16AP and the magnetic layer 41 are formed in the same manner as the step shown in FIG. 7 described in the first embodiment section.

Figure 18:
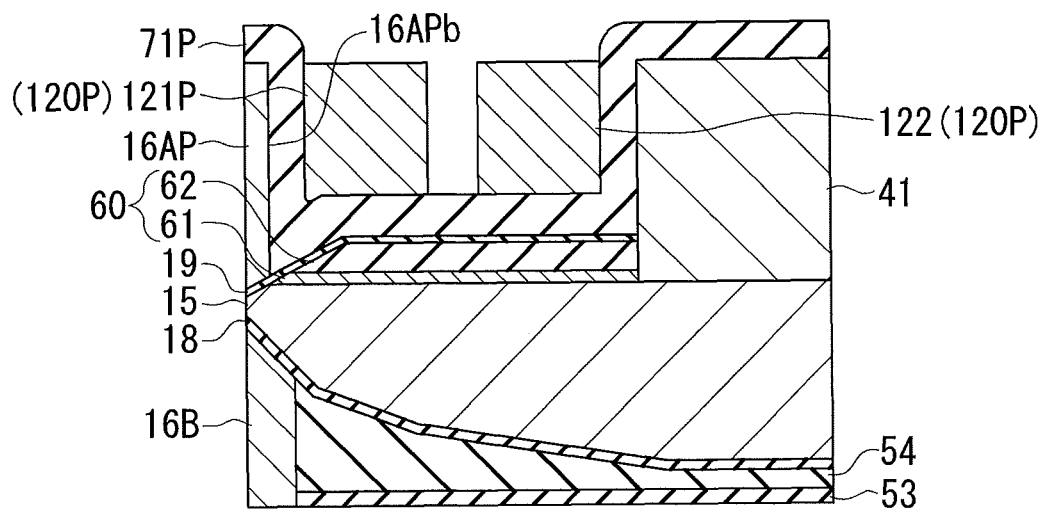
FIG. 18 is a cross-sectional view showing a step that follows the step shown in FIG. 17.

FIG. 18 shows the next step. In this step, first, the initial first insulating film 71P is formed and an opening for exposing the top surface of the second connection layer is formed in the initial first insulating film 71P in the same manner as in the step shown in FIG. 8 described in the first embodiment section. Then, an initial coil 120P, which will later become the first coil 120, is formed by frame plating, for example. The initial coil 120P includes an initial coil element 121P and the first coil element 122 located on the initial first insulating film 71P. The initial coil element 121P will later become the specific coil element 121.

Figure 19:
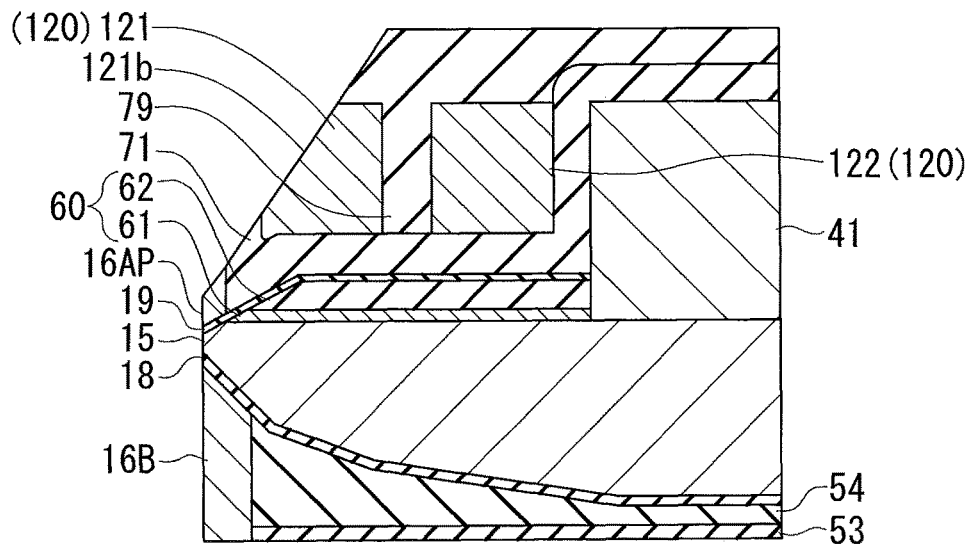
FIG. 19 is a cross-sectional view showing a step that follows the step shown in FIG. 18.

FIG. 19 shows the next step. In this step, first, the insulating layer 79 is formed to cover the initial coil 120P and the initial first insulating film 71P. Then, a first photoresist mask (not illustrated) is formed to cover part of each of the initial coil 120P, the initial first insulating film 71P and the insulating layer 79. The first photoresist mask is formed by patterning a photoresist layer. The first photoresist mask does not cover a portion of the initial coil 120P where the first inclined surface 121b of the specific coil element 121 is to be formed. The initial top shield layer 16AP, the initial coil element 121P, the initial first insulating film 71P and the insulating layer 79 are then etched in part by, for example, IBE, using the first photoresist mask as an etching mask. This etching provides the initial coil element 121P with the first inclined surface 121b of the specific coil element 121. This makes the initial coil element 121P into the specific coil element 121, thereby making the initial coil 120P into the first coil 120. This etching also makes the initial first insulating film 71P into the first insulating film 71. In this step, the first inclined surface 121b is formed in the initial coil element 121P such that, as shown in FIG. 15, the third end E13 of the first inclined surface 121b is located on the front side in the direction T of travel of the recording medium 90 relative to the bottom surface 121c of the specific coil element 121. The first photoresist mask is then removed.

Where IBE is employed to etch the initial top shield layer 16AP, the initial coil element 121P, the initial first insulating film 71P and the insulating layer 79 in part, the ion beams are allowed to travel in a direction at an angle with respect to the direction perpendicular to the top surface 1a (see FIGS. 2 and 3) of the substrate 1.

Figure 20:
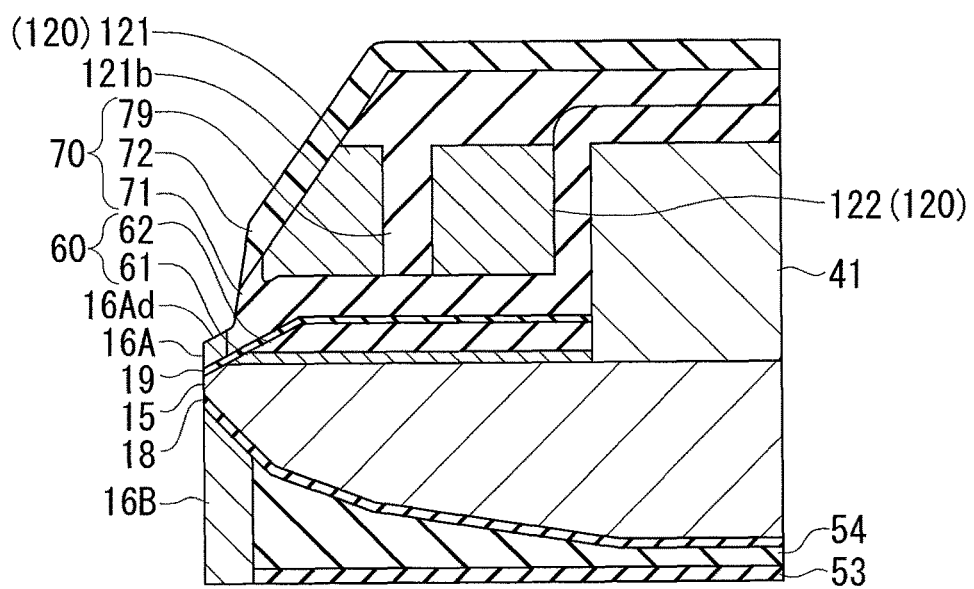
FIG. 20 is a cross-sectional view showing a step that follows the step shown in FIG. 19.

FIG. 20 shows the next step. In this step, first, the second insulating film 72 is formed over the entire top surface of the stack by atomic layer deposition, for example. The second insulating film 72 is formed to cover the first inclined surface 121b of the specific coil element 121 and the insulating layer 79. Then, a second photoresist mask (not illustrated) is formed on the top surface of the stack. The second photoresist mask is formed by the same method as that used for forming the first photoresist mask. The second photoresist mask does not cover a portion of the top surface of the stack near the location at which the medium facing surface 80 is to be formed. The initial top shield layer 16AP, the first insulating film 71 and the second insulating film 72 are then etched in part by, for example, IBE, using the second photoresist mask as an etching mask. This etching provides the initial top shield layer 16AP with the top surface 16Ad of the top shield layer 16A, thereby making the initial top shield layer 16AP into the top shield layer 16A. The second photoresist mask is then removed.

Figure 21:
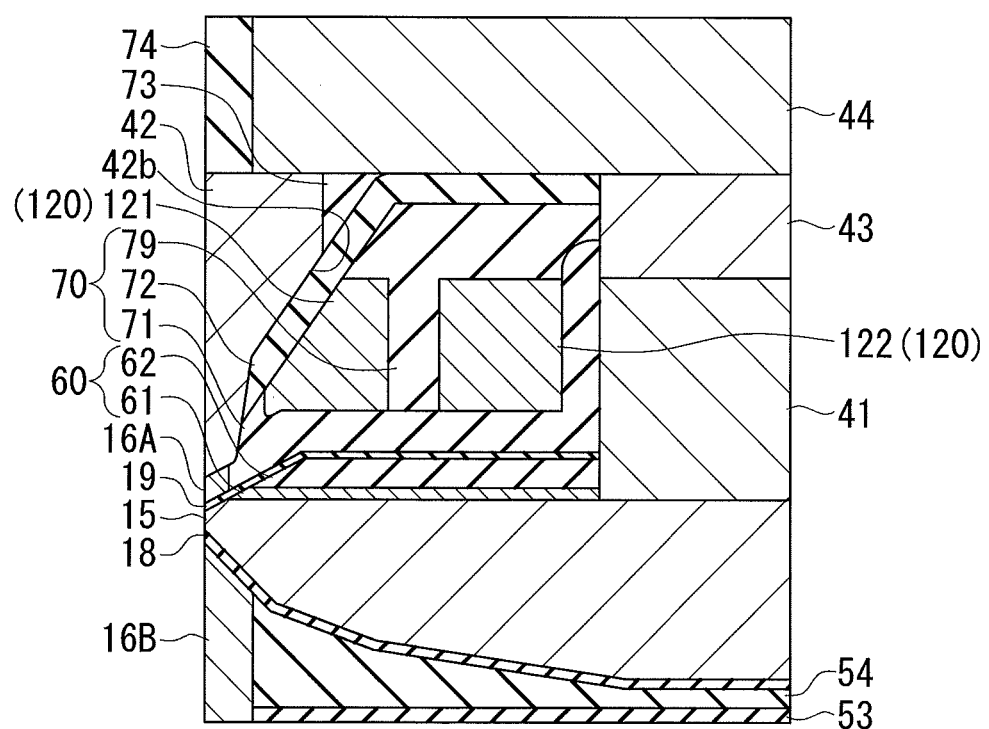
FIG. 21 is a cross-sectional view showing a step that follows the step shown in FIG. 20.

FIG. 21 shows the next step. In this step, first, the first insulating film 71, the second insulating film 72 and the insulating layer 79 are selectively etched to form therein openings for exposing the top surface of the magnetic layer 41. Then, the magnetic layers 42 and 43, the nonmagnetic layer 73, the magnetic layer 44 and the nonmagnetic layer 74 are formed in due order of succession in the same manner as the step shown in FIG. 13 described in the first embodiment section. The subsequent are the same as those in the first embodiment.

The remainder of configuration, function and effects of the present embodiment are similar to those of the first embodiment.

Fourth Embodiment

Figure 22:
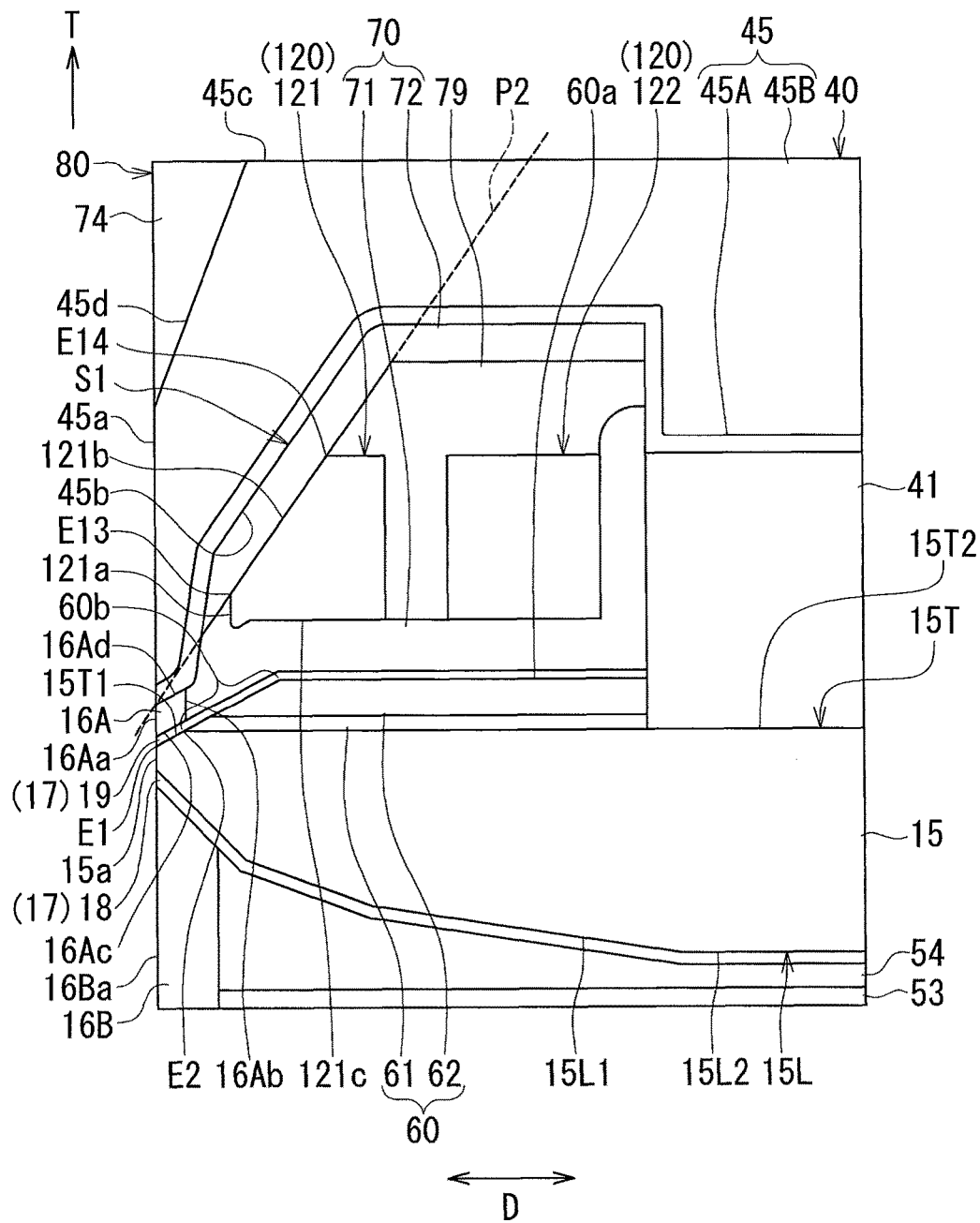
FIG. 22 is a cross-sectional view showing the main part of a magnetic head according to a fourth embodiment of the invention.

A magnetic head according to a fourth embodiment of the present invention will now be described with reference to FIG. 22. FIG. 22 is a cross-sectional view showing the main part of the magnetic head according to the present embodiment. FIG. 22 shows a cross section perpendicular to the medium facing surface and to the top surface of the substrate, particularly the main cross section. The arrow labeled T in FIG. 22 indicates the direction of travel of the recording medium.

The magnetic head according to the present embodiment differs from the magnetic head according to the third embodiment in the following ways. The magnetic head according to the present embodiment includes the magnetic layer 45 described in the second embodiment section, in place of the magnetic layers 42, 43 and 44 of the third embodiment. The nonmagnetic layer 73 is not provided in the present embodiment.

In the present embodiment, the second inclined surface 45b of the magnetic layer 45 is opposed to the first inclined surface 121b of the specific coil element 121. The second insulating film 72 extends to pass through between the first inclined surface 121b and the second inclined surface 45b.

The remainder of configuration, function and effects of the present embodiment are similar to those of the second or third embodiment.

Fifth Embodiment

Figure 23:
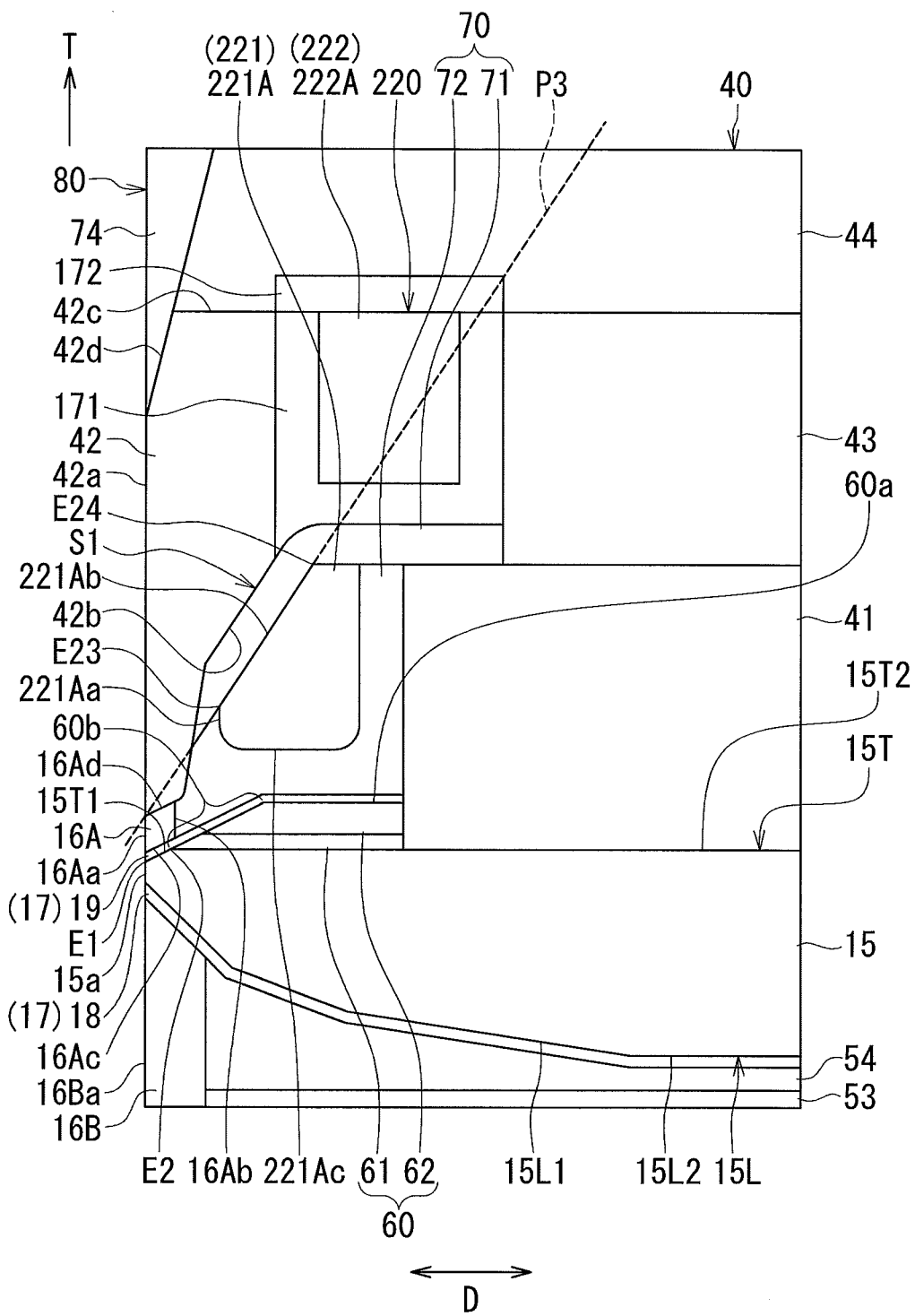
FIG. 23 is a cross-sectional view showing the main part of a magnetic head according to a fifth embodiment of the invention.
Figure 24:
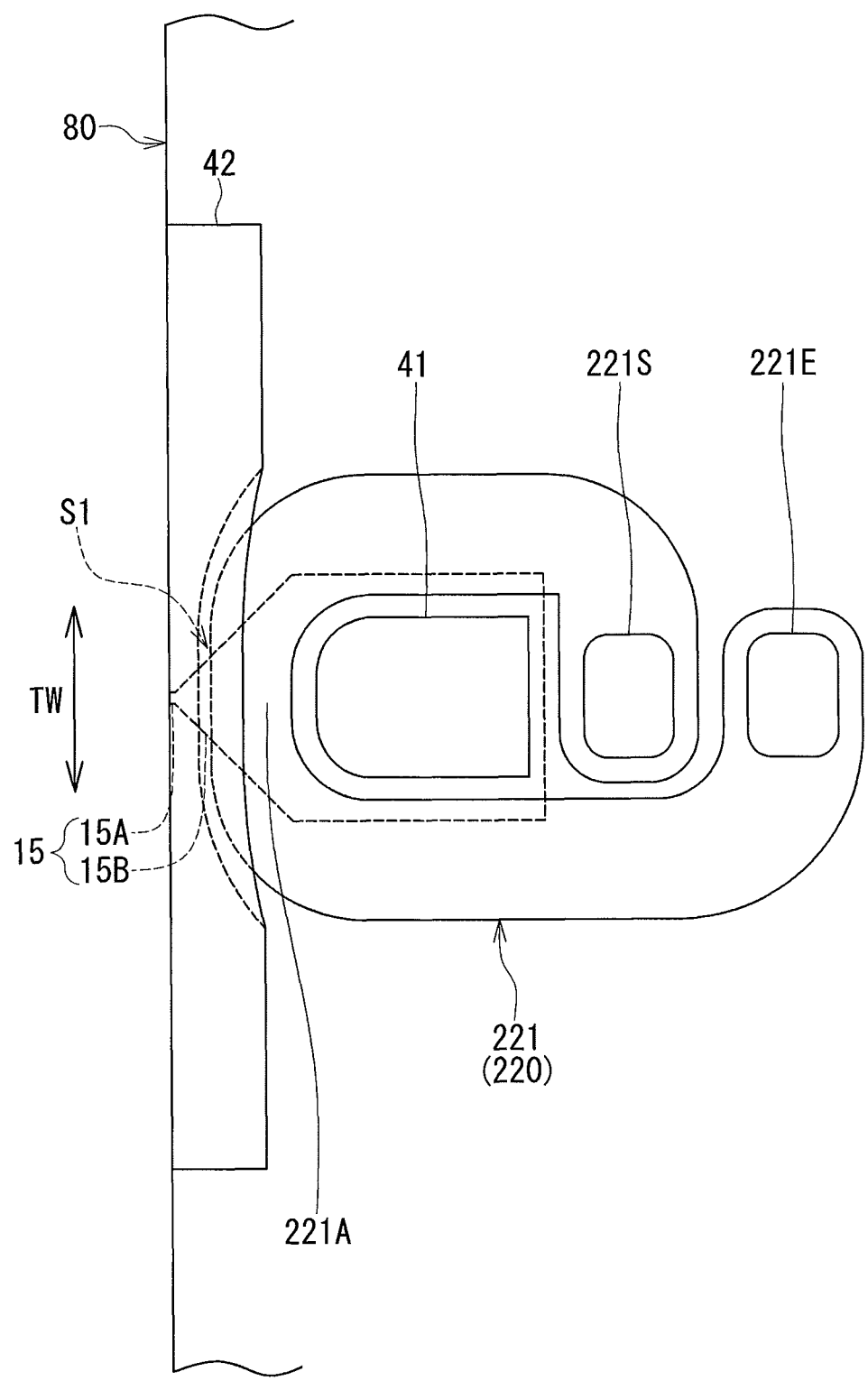
FIG. 24 is a plan view showing a first layer of a first coil of the magnetic head according to the fifth embodiment of the invention.
Figure 25:
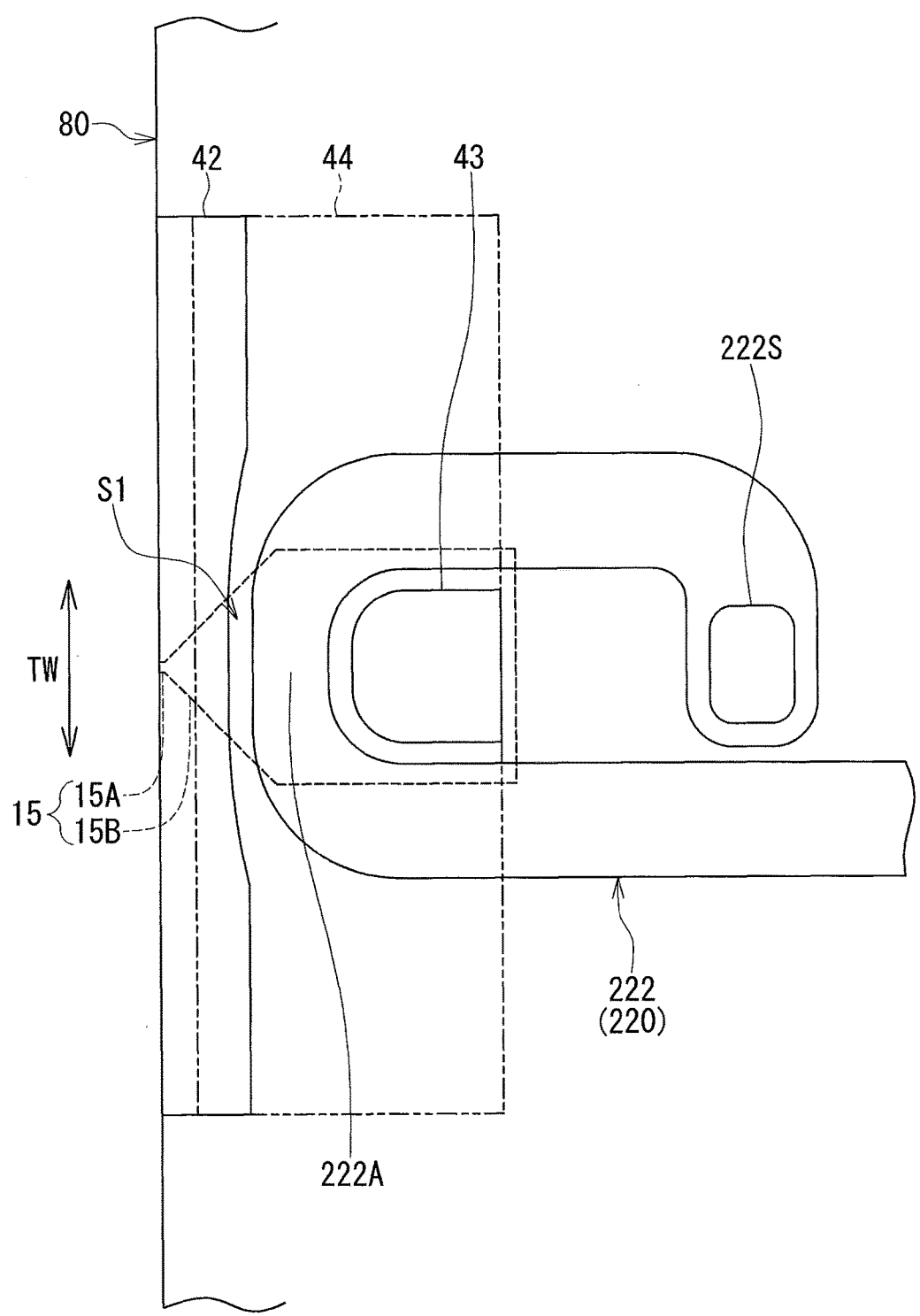
FIG. 25 is a plan view showing a second layer of the first coil of the magnetic head according to the fifth embodiment of the invention.

A magnetic head according to a fifth embodiment of the invention will now be described with reference to FIGS. 23 to 25. FIG. 23 is a cross-sectional view showing the main part of the magnetic head according to the present embodiment. FIG. 23 shows a cross section perpendicular to the medium facing surface and to the top surface of the substrate, particularly the main cross section. The arrow labeled T in FIG. 23 indicates the direction of travel of the recording medium. FIG. 24 is a plan view showing a first layer of a first coil of the magnetic head according to the present embodiment. FIG. 25 is a plan view showing a second layer of the first coil of the magnetic head according to the present embodiment. The arrow labeled TW in FIGS. 24 and 25 indicates the track width direction.

The magnetic head according to the present embodiment differs from the magnetic head according to the first embodiment in the following ways. The magnetic head according to the present embodiment includes a first coil 220 in place of the first coil 20 of the first embodiment. The first coil 220 includes a first layer 221 and a second layer 222. As shown in FIG. 24, the first layer 221 is wound once around the magnetic layer 41. In the present embodiment, the first insulating film 71 separates at least part of the first layer 221 from the top shield layer 16A, the second gap layer 19 and the magnetic layer 41. The second insulating film 72 is disposed to cover at least part of the first layer 221 and the first insulating film 71.

The second layer 222 lies above the first layer 221. As shown in FIG. 25, the second layer 222 is wound approximately once around the magnetic layer 43. The magnetic head according to the present embodiment includes an insulating film 171 formed of an insulating material and separating the second layer 222 from the magnetic layers 42 and 43 and the second insulating film 72. The insulating film 171 is formed of alumina, for example. Although not illustrated, in the present embodiment the nonmagnetic layer 73 (see FIGS. 1 and 2) is disposed around the magnetic layer 42 and the second layer 222. The top surfaces of the magnetic layers 42 and 43, the second layer 222, the nonmagnetic layer 73 and the insulating film 171 are even with each other.

The magnetic head according to the present embodiment further includes an insulating layer 172 formed of an insulating material and lying on the top surfaces of the second layer 222 and the insulating film 171. The insulating layer 172 is formed of alumina, for example. In the present embodiment, the magnetic layer 44 lies over the magnetic layers 42 and 43 and the insulating layer 172.

In the present embodiment, the magnetic layer 42 has the end face 42a and the second inclined surface 42b described in the first embodiment section, and further has a top surface 42c, and a connecting surface 42d connecting the end face 42a and the top surface 42c to each other. The end face of the magnetic layer 44 facing toward the medium facing surface 80 is contiguous with the connecting surface 42d of the magnetic layer 42. The distance from the medium facing surface 80 to an arbitrary point on each of the connecting surface 42d of the magnetic layer 42 and the aforementioned end face of the magnetic layer 44 increases with increasing distance from the arbitrary point to the top surface 1a (see FIGS. 2 and 3) of the substrate 1. A portion of the nonmagnetic layer 74 is interposed between the medium facing surface 80 and each of the connecting surface 42d of the magnetic layer 42 and the aforementioned end face of the magnetic layer 44.

The first layer 221 and the second layer 222 of the first coil 220 will now be described in detail. As shown in FIG. 24, the first layer 221 includes a first coil element 221A extending to pass through the first space S1, particularly through between the magnetic layer 42 and the magnetic layer 41. The first layer 221 has a coil connection 221S electrically connected to the coil connection 10E (see FIG. 4) of the second coil 10, and a coil connection 221E electrically connected to the second layer 222. The coil connection 221S is electrically connected to the coil connection 10E via the first and second connection layers described in the first embodiment section. The coil connection 221S lies on the second connection layer.

As shown in FIG. 25, the second layer 222 includes a first coil element 222A extending to pass through the first space S1, particularly through between the magnetic layer 42 and the magnetic layer 43. The second layer 222 has a coil connection 222S electrically connected to the coil connection 221E of the first layer 221. The coil connection 222S penetrates the second insulating film 72 and the insulating film 171 shown in FIG. 23, and is electrically connected to the coil connection 221E. The first coil 220 and the second coil 10 are connected in series.

Since the first layer 221 and the second layer 222 are portions of the first coil 220, the first coil 220 can be said to include the first coil elements 221A and 222A. In the present embodiment, the first coil element 221A is the specific coil element. The specific coil element 221A is of the same shape as the specific coil element 21 of the first embodiment. More specifically, as shown in FIG. 23, the specific coil element 221A includes: a front end portion 221Aa located closest to the medium facing surface 80; a first inclined surface 221Ab located on the trailing side, i.e., the front side in the direction T of travel of the recording medium 90 (see FIG. 2) relative to the front end portion 221Aa and contiguous with the front end portion 221Aa; and a bottom surface 221Ac facing the flat portion 15T2 of the top surface 15T of the main pole 15. The front end portion 221Aa is located at a distance of, for example, 0.15 to 0.25 μm from the medium facing surface 80.

The first inclined surface 221Ab has a third end E23 closest to the medium facing surface 80 and a fourth end E24 opposite to the third end E23. The first inclined surface 221Ab is inclined with respect to the medium facing surface 80 and the direction D perpendicular to the medium facing surface 80 such that the fourth end E24 is located at a greater distance from the medium facing surface 80 than is the third end E23. The third end E23 is located on the front side in the direction T of travel of the recording medium 90 relative to the bottom surface 221Ac of the specific coil element 221A.

The top shield layer 16A is located on the front side in the direction T of travel of the recording medium 90 relative to the main pole 15, and is located closer to the medium facing surface 80 than is the specific coil element 221A. As shown in FIG. 23, let us assume an imaginary plane P3 including the first inclined surface 221Ab of the specific coil element 221A. The top shield layer 16A is located on the leading side, i.e., the rear side in the direction T of travel of the recording medium 90, relative to the imaginary plane P3.

The second inclined surface 42b of the magnetic layer 42 is opposed to the first inclined surface 221Ab of the specific coil element 221A. The second inclined surface 42b is inclined with respect to the medium facing surface 80 and the direction D perpendicular to the medium facing surface 80 in such a manner as to become parallel or almost parallel to the first inclined surface 221Ab of the specific coil element 221A.

In the present embodiment, the insulating section 70 surrounds the specific coil element 221A. The first insulating film 71 and the second insulating film 72 are in contact with each other in the imaginary plane P3. The first insulating film 71 is located on the leading side, i.e., the rear side in the direction T of travel of the recording medium 90 relative to the imaginary plane P3, and extends to be in contact with the rear end face 16Ab of the top shield layer 16A and the front end portion 221Aa and bottom surface 221Ac of the specific coil element 221A. The first insulating film 71 further extends to pass through between the specific coil element 221A and the magnetic layer 41. The second insulating film 72 extends to pass through between the first inclined surface 221Ab and the second inclined surface 42b.

Figure 26:
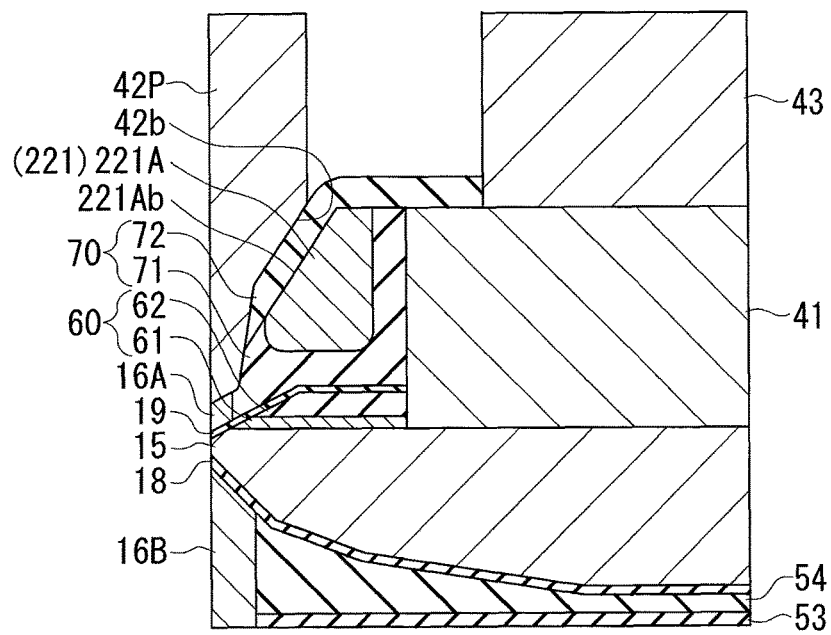
FIG. 26 is a cross-sectional view showing a step of a method of manufacturing the magnetic head according to the fifth embodiment of the invention.
Figure 27:
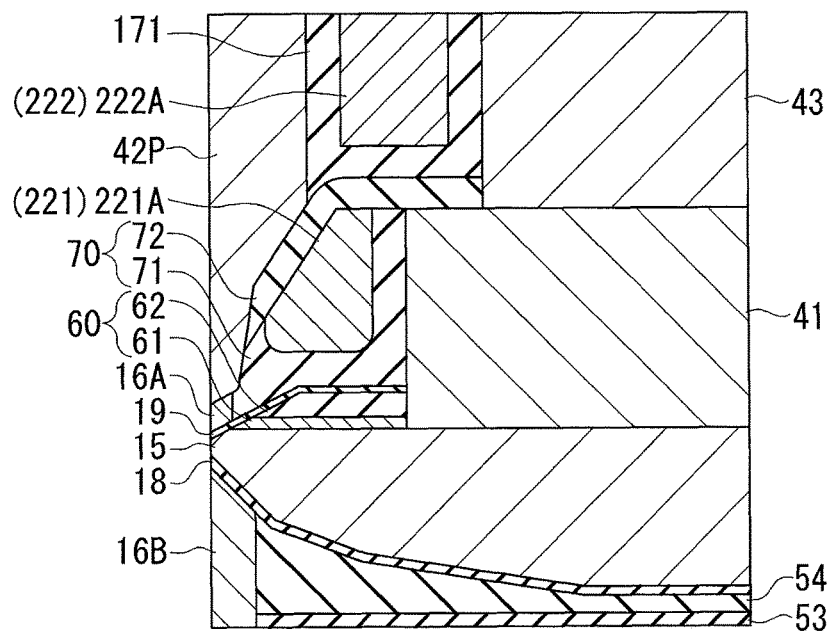
FIG. 27 is a cross-sectional view showing a step that follows the step shown in FIG. 26.
Figure 28:
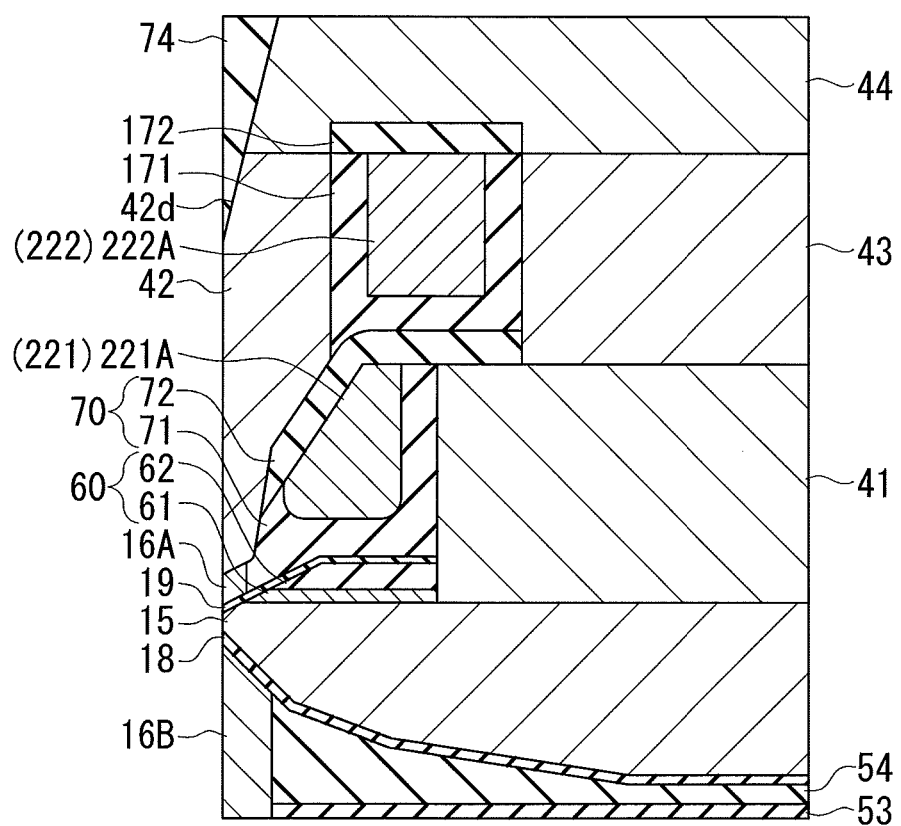
FIG. 28 is a cross-sectional view showing a step that follows the step shown in FIG. 27.

A method of manufacturing the magnetic head according to the present embodiment will now be described with reference to FIGS. 26 to 28. FIGS. 26 to 28 each illustrate a stack of layers formed in the process of manufacturing the magnetic head. FIGS. 26 to 28 show a cross section perpendicular to the medium facing surface 80 and to the top surface 1a (see FIGS. 2 and 3) of the substrate 1, particularly the main cross section. FIGS. 26 to 28 omit the illustration of portions located below the bottom shield layer 16B and the insulating layer 53.

The method of manufacturing the magnetic head according to the present embodiment is the same as the method according to the first embodiment up to the step shown in FIG. 12. In the present embodiment, the first layer 221 of the first coil 220 is formed instead of the first coil 20 of the first embodiment. The first layer 221 is formed by the same method as that used for forming the first coil 20.

FIG. 26 shows the next step. In this step, first, the second insulating film 72 is selectively etched to form therein an opening for exposing the top surface of the magnetic layer 41. Then, an initial magnetic layer 42P, which will later become the magnetic layer 42, is formed on the top shield layer 16A, the first insulating film 71 and the second insulating film 72, and the magnetic layer 43 is formed on the magnetic layer 41, by frame plating, for example. The initial magnetic layer 42P and the magnetic layer 43 are formed to be greater in length in the direction T of travel of the recording medium 90 (the upward direction in FIG. 26) than the magnetic layer 42 and the magnetic layer 43 of the first embodiment, respectively.

FIG. 27 shows the next step. In this step, first, the insulating film 171 is formed over the entire top surface of the stack by atomic layer deposition, for example. The second insulating film 72 and the insulating film 171 are then selectively etched to form therein openings for exposing the coil connection 221E (see FIG. 24) of the first layer 221. Then, the second layer 222 of the first coil 220 is formed by frame plating, for example. Next, the nonmagnetic layer 73 (not illustrated) is formed over the entire top surface of the stack. The insulating film 171 and the nonmagnetic layer 73 are then polished by, for example, CMP, until the initial magnetic layer 42P, the magnetic layer 43 and the second layer 222 are exposed.

FIG. 28 shows the next step. In this step, first, the insulating layer 172 is formed over the entire top surface of the stack. The insulating layer 172 is then selectively etched to form therein an opening for exposing the top surface of the initial magnetic layer 42P and an opening for exposing the top surface of the magnetic layer 43. Next, the magnetic layer 44 is formed by frame plating, for example. The initial magnetic layer 42P and the magnetic layer 44 are then etched by, for example, RIE or IBE so as to provide the initial magnetic layer 42P with the connecting surface 42d of the magnetic layer 42 and provide the magnetic layer 44 with the end face mentioned previously. This etching makes the initial magnetic layer 42P into the magnetic layer 42. Next, the nonmagnetic layer 74 is formed over the entire top surface of the stack. The nonmagnetic layer 74 is then polished by, for example, CMP, until the magnetic layer 44 is exposed. The subsequent steps are the same as those in the first embodiment.

The remainder of configuration, function and effects of the present embodiment are similar to those of the first embodiment.

The present invention is not limited to the foregoing embodiments, and various modifications may be made thereto. For example, as far as the requirements of the appended claims are met, the main pole 15, the top shield layer 16A, the first coil 20, 120 or 220, the second coil 10, the specific coil element 21, 121 or 221A, and the first return path section 40 may be shaped and located as desired, and need not necessarily be as in the respective examples illustrated in the foregoing embodiments.

The coils of the present invention may be ones that are wound helically around the main pole 15.

Obviously, many modifications and variations of the present invention are possible in the light of the above teachings. Thus, it is to be understood that, within the scope of the appended claims and equivalents thereof, the invention may be practiced in other than the foregoing most preferable embodiments.

What is claimed is:

1. A magnetic head for perpendicular magnetic recording, comprising:
    a medium facing surface configured to face a recording medium;
    a coil for producing a magnetic field corresponding to data to be written on the recording medium;
    a main pole having an end face located in the medium facing surface, the main pole being configured to pass a magnetic flux corresponding to the magnetic field produced by the coil, and to produce a write magnetic field for use to write the data on the recording medium by means of a perpendicular magnetic recording system;
a write shield formed of a magnetic material and having an end face located in the medium facing surface;
a gap section formed of a nonmagnetic material and located between the main pole and the write shield; and
a first return path section formed of a magnetic material; and
a substrate having a top surface, wherein
the coil, the main pole, the write shield, the gap section, and the first return path section are located above the top surface of the substrate,
the first return path section is located farther from the top surface of the substrate than is the main pole,
the end face of the write shield includes a first end face portion which is located farther from the top surface of the substrate than is the end face of the main pole,
the first return path section connects the write shield and part of the main pole located away from the medium facing surface to each other so that a first space is defined by the main pole, the gap section, the write shield and the first return path section,
the coil includes at least one first coil element extending to pass through the first space,
the main pole has a top surface located at an end of the main pole farthest from the top surface of the substrate,
the top surface of the main pole includes an inclined portion and a flat portion, the inclined portion being located closer to the medium facing surface than the flat portion,
the inclined portion has a first end located in the medium facing surface and a second end opposite to the first end,
the inclined portion is inclined with respect to the medium facing surface and a direction perpendicular to the medium facing surface such that the second end is located farther from the top surface of the substrate than is the first end,
the flat portion extends substantially perpendicular to the medium facing surface,
the at least one first coil element includes a specific coil element,
the specific coil element has: a front end portion closest to the medium facing surface; a first inclined surface which is located farther from the top surface of the substrate than is the front end portion and contiguous with the front end portion; and a bottom surface facing the flat portion of the top surface of the main pole,
the first inclined surface has a third end closest to the main pole, and a fourth end opposite to the third end,
the first inclined surface is inclined with respect to the medium facing surface and the direction perpendicular to the medium facing surface such that the fourth end is located at a greater distance from the medium facing surface than is the third end,
the third end is located farther from the top surface of the substrate than is the bottom surface of the specific coil element,
the write shield includes a top shield layer which is located farther from the top surface of the substrate than is the main pole and located closer to the medium facing surface than is the specific coil element,
the top shield layer has: a front end face constituting at least part of the first end face portion; a rear end face opposite to the front end face; a bottom surface opposed to the inclined portion of the top surface of the main pole with the gap section interposed therebetween; and a top surface opposite to the bottom surface,
the first return path section is connected to the top surface of the top shield layer and has a second inclined surface opposed to the first inclined surface of the specific coil element,
the top shield layer is located closer to the top surface of the substrate than is an imaginary plane including the first inclined surface of the specific coil element, and
the magnetic head further comprises an insulating section formed of an insulating material, the insulating section being located in the first space and surrounding the at least one first coil element.

2. The magnetic head for perpendicular magnetic recording according to claim 1, wherein
the insulating section includes a first insulating film and a second insulating film,
the first insulating film and the second insulating film are in contact with each other in the imaginary plane,
the first insulating film is located closer to the top surface of the substrate than is the imaginary plane, and extends to be in contact with the rear end face of the top shield layer and the front end portion and bottom surface of the specific coil element, and
the second insulating film extends to pass through between the first inclined surface and the second inclined surface.

3. The magnetic head for perpendicular magnetic recording according to claim 1, further comprising a nonmagnetic section formed of a nonmagnetic material and interposed between the flat portion of the top surface of the main pole and the first insulating film,
wherein the nonmagnetic section has a top surface located at an end of the nonmagnetic section farthest from the top surface of the substrate, and a front end face facing toward the medium facing surface and contiguous with the inclined portion.

4. The magnetic head for perpendicular magnetic recording according to claim 1, wherein the top shield layer is formed of a magnetic material having a saturation flux density higher than that of the magnetic material used to form at least part of the first return path section.

5. The magnetic head for perpendicular magnetic recording according to claim 1, wherein
the first return path section includes a first layer and a second layer each formed of a magnetic material, the magnetic material used to form the first layer and the magnetic material used to form the second layer being different from each other,
the first layer connects the top shield layer and the main pole to each other,
the second layer is stacked on the first layer, and
the magnetic material used to form the first layer has a saturation flux density higher than that of the magnetic material used to form the second layer.

6. The magnetic head for perpendicular magnetic recording according to claim 1, wherein
the end face of the write shield includes a second end face portion which is located closer to the top surface of the substrate than is the end face of the main pole,
the magnetic head further comprises a second return path section formed of a magnetic material, the second return path section being located closer to the top surface of the substrate than is the main pole,
the second return path section connects the write shield and part of the main pole located away from the medium facing surface to each other so that a second space is defined by the main pole, the gap section, the write shield and the second return path section, and the coil includes at least one second coil element extending to pass through the second space.

7. The magnetic head for perpendicular magnetic recording according to claim 6, wherein the end face of the write shield further includes a third end face portion and a fourth end face portion, the third end face portion and the fourth end face portion being located on opposite sides of the end face of the main pole in a track width direction.

8. A method of manufacturing the magnetic head for perpendicular magnetic recording of claim 1, wherein the insulating section includes a first insulating film and a second insulating film, the first insulating film and the second insulating film are in contact with each other in the imaginary plane, the first insulating film is located closer to the top surface of the substrate than is the imaginary plane, and extends to be in contact with the rear end face of the top shield layer and the front end portion and bottom surface of the specific coil element, and the second insulating film extends to pass through between the first inclined surface and the second inclined surface, the method comprising the steps of:

forming a magnetic layer;

etching the magnetic layer so as to provide the magnetic layer with the inclined portion and the flat portion and thereby make the magnetic layer into the main pole;

forming the gap section;

forming an initial top shield layer after the main pole and the gap section are formed, the initial top shield layer having an initial rear end face that is greater than the rear end face of the top shield layer in length in a direction perpendicular to the top surface of the substrate, the initial top shield layer undergoing etching later to become the top shield layer;

forming an initial first insulating film to be in contact with the initial rear end face after the initial top shield layer is formed;

forming an initial coil which will later become the coil, the initial coil including an initial coil element located on the initial first insulating film;

etching the initial coil element and the initial first insulating film so as to provide the initial coil element with the first inclined surface of the specific coil element and thereby make the initial coil element into the specific coil element, and to make the initial first insulating film into the first insulating film;

forming the second insulating film to cover the first inclined surface of the specific coil element; and forming the first return path section, wherein the step of forming the first return path section forms at least part of the first return path section after the second insulating film is formed, the at least part of the first return path section including the second inclined surface.

9. The method of manufacturing the magnetic head for perpendicular magnetic recording according to claim 8, wherein the magnetic head further comprises a nonmagnetic section formed of a nonmagnetic material and interposed between the flat portion of the top surface of the main pole and the first insulating film, the nonmagnetic section has a top surface located at an end of the nonmagnetic section farthest from the top surface of the substrate, and a front end face facing toward the medium facing surface and contiguous with the inclined portion, and the method further comprises the steps of: forming an initial nonmagnetic section on the magnetic layer; and etching the initial nonmagnetic section so as to provide the initial nonmagnetic section with the front end face of the nonmagnetic section and thereby make the initial nonmagnetic section into the nonmagnetic section.

* * * * *